United States Patent [19]

Chen

[11] Patent Number: 5,226,092
[45] Date of Patent: Jul. 6, 1993

[54] METHOD AND APPARATUS FOR LEARNING IN A NEURAL NETWORK

[75] Inventor: Kaihu Chen, Shirley, Mass.

[73] Assignee: Digital Equipment Corporation, Maynard, Mass.

[21] Appl. No.: 724,381

[22] Filed: Jun. 28, 1991

[51] Int. Cl.[5] .............................................. G06K 9/62
[52] U.S. Cl. ........................................ 382/14; 382/15; 395/50
[58] Field of Search .................... 382/14, 15; 364/513; 371/35; 396/50, 52

[56] References Cited

U.S. PATENT DOCUMENTS 3,950,733  4/1976  Cooper et al. .......................... 382/15
5,063,601  11/1991  Hayduk .................................. 382/14

Primary Examiner—Michael T. Razavi
Assistant Examiner—Yon Jung
Attorney, Agent, or Firm—Kenyon & Kenyon

[57] ABSTRACT

A method and apparatus for speeding and enhancing the "learning" function of a computer configured as a multilayered, feed format artificial neural network using logistic functions as an activation function. The enhanced learning method provides a linear probing method for determining local minima values computed first along the gradient of the weight space and then adjusting the slope and direction of a linear probe line after determining the likelihood that a "ravine" has been encountered in the terrain of the weight space.

40 Claims, 13 Drawing Sheets

FIG. 6B

| UNIT IDENTIFIER | LAYER I.D. | RAW INPUT VALUES RECEIVED INPUT FROM UNIT | OUTPUT | DESIRED OUTPUT (FOR OUTPUT LAYERS ONLY) |
|---|---|---|---|---|
| $U_0$ | | | | |
| $U_1$ | | | | |
| $U_2$ | | | | |
| $U_3$ | | | | |
| ⋮ | ⋮ | ⋮ | ⋮ | ⋮ |
| $U_N$ | | | | |

44A  44B  44C  44D  44E

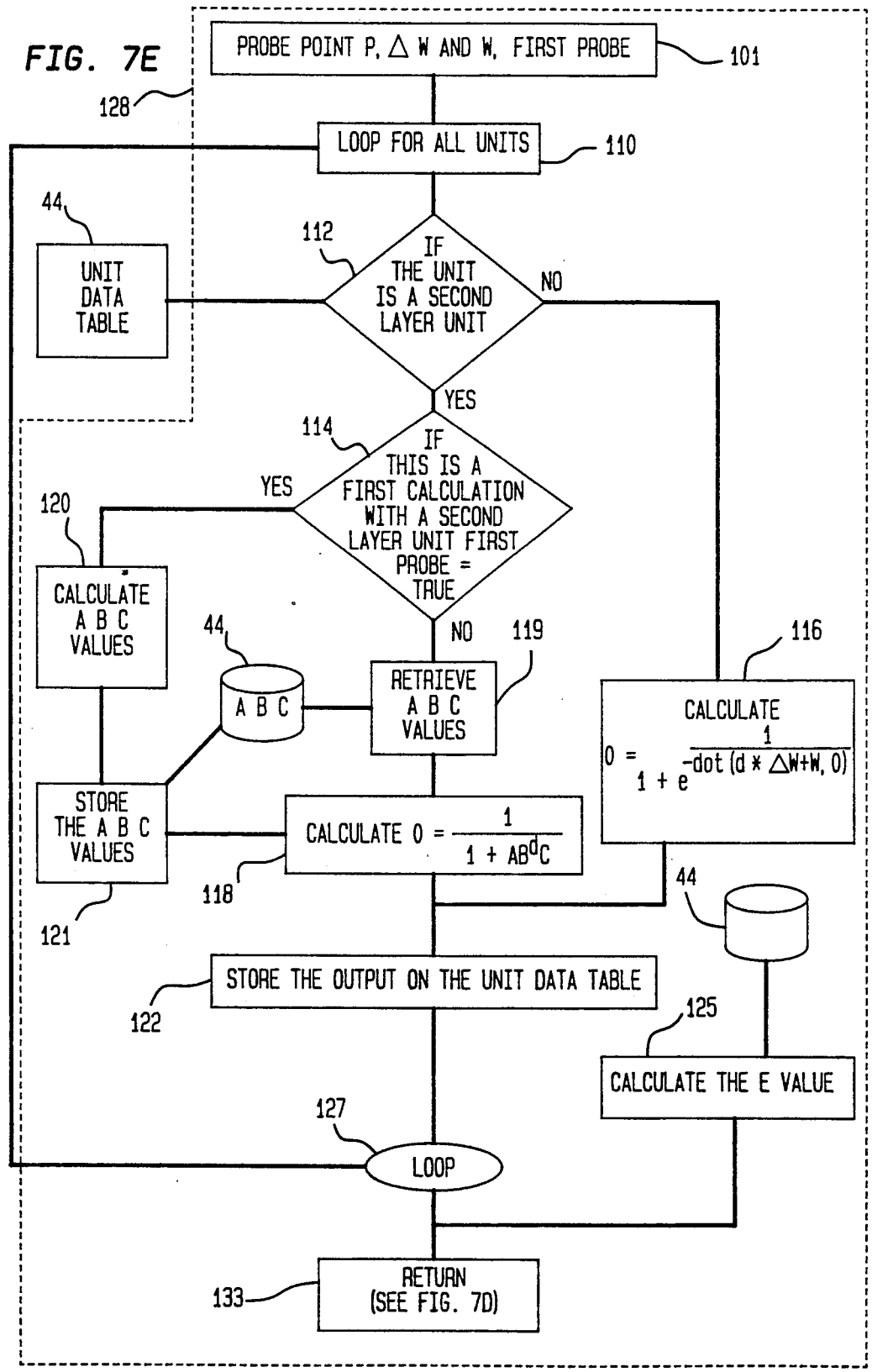

METHOD AND APPARATUS FOR LEARNING IN A NEURAL NETWORK

FIELD OF THE INVENTION

This invention pertains generally to the field of computer-based pattern recognition systems by simulated neural processes, commonly called neural networks or parallel distributed processing systems. More particularly, the invention pertains to an improved method and apparatus to speed the "learning" function in a neural network.

BACKGROUND OF THE INVENTION

An artificial neural network is a type of information processing system whose architecture is inspired by the biologically-evolved neural systems found in animals. The interest of computer scientists in the study of biological neural systems, like the human brain, began when it was discerned that traditional programming and engineering techniques could not create pattern recognition systems to mimic functions that people do so easily every day, such as understanding language, recognizing a face in a crowd or associating an abstract concept with an event.

One goal that is central to the study of biological neural systems is to create an artificial neural system that can be dynamically modified in response to external input. The hope is to create systems that can "learn". The present invention, which will be described below, presents a method and apparatus to speed the "learning" process for specific types of neural networks called multilayered, feed-forward neural networks, which use logistic activation functions.

There are various architectures and approaches to "learning" in neural network design which are well-known in the art and generally described in text books, such as Rumelhart, et al., *Parallel Distributed Processing*, MIT Press 1986. However, a brief description of neural network architecture and the various approaches to "learning" provide important background for the present invention.

A neural network comprises a highly interconnected set of simple processing units. The network is designed to accept a set of inputs, called an input pattern, process the input pattern data, and return a set of outputs called an output pattern. The theory is that a pattern can be recognized by mapping the input through a large set of interconnected, simple processing units. Although dependent on other units in the network for input, each unit in a neural network can be configured to independently process its input (e.g., in parallel) with the other units. In this sense, a neural network can be thought of as one form of a parallel distributed processing system.

The architecture of each simple processing unit is roughly based on the structure of biological neuron cells found in animals. The basic processing unit of an artificial network is called an artificial neuron unit (hereinafter used interchangeably with the term "unit") and is designed to replicate the basic anatomy of a biological neuron's dendrites, cell body, axon and synapse. Generally, an artificial neuron unit is configured to receive a large number of inputs, either from data input sources or from other artificial neuron units to replicate the way a biological neuron receives input signals from a plurality of attached dendrites. An artificial neuron unit mimics the activity of the cell body of the biological neuron through the use of threshold and output functions. A threshold function accepts all input and performs a function to determine whether the sum of the input plus any previously existing activation input surpasses a threshold value. If so, the neuron will process the input according to an output function and send an output signal to the plurality of other similarly configured neurons that are connected to it. Generally, the threshold function and output functions are combined into one function, collectively called an activation function, which accepts all inputs and maps them to an output value in one step.

The connections between the individual processing units in an artificial neural network are also modeled after biological processes. Each input to an artificial neuron unit is weighted by multiplying it by a weight value in a process that is analogous to the biological synapse function. In biological systems, a synapse acts as a connector between one neuron and another, generally between the axon (output) end of one neuron and the dendrite (input) end of another cell. Synaptic junctions have the ability to enhance or inhibit (i.e., weight) the output of one neuron as it is input to another. Artificial neural networks model this synaptic function by weighing the inputs to each artificial neuron.

The individual units can be organized into an artificial neural network using one of many different architectures. A "single level" architecture is defined to have no hierarchical structure - any unit can communicate with any other unit and units can even feedback inputs to themselves. Of general relevance to the present invention is another type of architecture called a layered hierarchical architecture. In such architecture, the units of the artificial neural network are grouped into layers and the network of interconnections is dictated by the layering scheme. Networks are commonly configured into two-layer and multilayer schemes. A two-layer scheme comprises an input layer and an output layer, each layer comprising neural network units. This architecture is commonly referred to as a "one-step" system. A multilayer neural network comprises an input layer of units and output layer of units connected to one or more levels of middle-layers, comprising units, that are often called "hidden" layers.

A particular type of multilayer neural network is called a feed-forward neural network, which facilitates "bottom up" processing. As stated in Rumelhart et al., the primary characteristic of a feed-forward network is that the units at any layer may not affect the activity of units at any layer "lower" than it. Thus, as inputs are first fed to units at the lower layers, processed, and input to succeeding layers, processing in those networks is performed from the "bottom up". Additionally in a pure feed-forward neural network, there are no units that accept inputs from more than one layer. The learning method and apparatus of the present invention, which will be described below, is particularly suited for use in multilayered, feed-forward neural networks.

Much of the study of "learning" in neural networks has focused on the use of multilayered architectures, because of the inherent use limitations found in two-layered architectures. Studies have shown that a network without internal representations (i.e., without hidden units) is unable to perform mappings where an input pattern of one configuration is mapped to an output pattern that is dissimilar. However, studies have also shown that if there is a large layer of hidden units, properly connected, any input pattern can always be mapped to any output pattern, even where the input and the output patterns are dissimilar. In fact, multilayered, feed-forward neural network architectures are among the most common in the neural network field. Thus, the applicability of the improved learning method of the present invention to multilayered, feed-forward neural network architectures is of great relevance to the field.

Neural networks are not programmed to recognize patterns - they "learn." Learning here is defined as any self-directed change in a knowledge structure that improves performance. Neural network systems do not access a set of expert rules that are stored in a knowledge base, as expert systems do. Moreover, the previously used input patterns are not maintained or saved in neural networks for later matching against new input. Rather, what is stored are connection strengths (i.e., the weight values) between the artificial neuron units. The weight value set comprising a set of values associated with each connection in the neural network, is used to map an input pattern to an output pattern. In contrast to the expert rules explicitly stored in expert system architectures, the set of weight values used between unit connections in a neural network is the knowledge structure. "Learning" in a neural network means modifying the weight values associated with the interconnecting paths of the network so that an input pattern maps to a pre-determined or "desired" output pattern. In the study of neural network behavior, learning models have evolved that consist of rules and procedures to adjust the synaptic weights assigned to each input in response to a set of "learning" or "teaching" inputs. Most neural network systems provide learning procedures that modify only the weights—there are generally no rules to modify the activation function or to change the connections between units. Thus, if an artificial neural network has any ability to alter its response to an input stimulus (i.e., "learn" as it has been defined), it can only do so by altering its set of "synaptic" weights.

Of general relevance to the present invention is a group of learning techniques classified as pattern association. The goal of pattern association systems is to create a map between an input pattern defined over one subset of the units (i.e., the input layer) and an output pattern as it is defined over a second set of units (i.e., the output layer). The process attempts to specify a set of connection weights so that whenever a particular input pattern reappears on the input layer, the associated output pattern will appear on the second set. Generally in pattern association systems, there is a "teaching" or "learning" phase of operation during which an input pattern called a teaching pattern is input to the neural network. The teaching input comprises of a set of known inputs and has associated with it a set of known or "desired" outputs. If, during a training phase, the actual output pattern does not match the desired output pattern, a learning rule is invoked by the neural network system to adjust the weight value associated with each connection of the network so that the training input pattern will map to the desired output pattern.

Virtually all of the currently used learning procedures for weight adjustment have been derived from the learning rule of psychoanalyst D. O. Hebb, which states that if a unit, $u_j$, receives an input from another unit, $u_i$, and both are highly active, the weight, $w_{ji}$, in the connection from $u_i$ to $u_j$ should be strengthened. D. O. Hebb, *The Organization of Behavior*, (New York, Wiley, 1949).

The Hebbian learning rule has been translated into a mathematical formula:

$$\Delta w_{ji} = g(a_j(t), t_j(t)) h(o_i(t), w_{ji}) \quad (1)$$

The equation states that the change in the weight connection $\Delta w_{ji}$ from unit $u_i$ to $u_j$ is the product of two functions: $g()$, with arguments comprising the activation function of $u_j$, $a_j(t)$, and the teaching input to unit $u_j$, $t_j(t)$, multiplied by the result of another function, $h()$, whose arguments comprise the output of $u_i$ from the training example, $o_i(t)$, and the weight associated with the connection between unit $u_i$ and $u_j$, $w_{ji}$.

This general statement of the Hebbian learning rule is implemented differently in different kinds of neural network systems, depending on the type of neural network architecture and the different variations of the Hebbian learning rule chosen. In one common variation of the rule, it has been observed that:

$$h(o_i(t), w_{ji}) = i_i \quad (2)$$

and $$g(a_j(t), t_j(t)) = \eta(t_j(t) - a_j(t)) \quad (3)$$

where $i_i$ equals the ith element of the output of unit $u_i$ (or the input to $u_j$), and $\eta$ represents a constant of proportionality. Thus, for any input pattern p the rule can be written:

$$\Delta_p w_{ji} = \eta(t_{pj} - o_{pj}) i_{pi} = \eta \delta_{pj} i_{pi} \quad (4)$$

where $t_{pj}$ is the desired output (i.e., the teaching pattern) for the jth element of the output pattern for p, $o_{pj}$ is the jth element of the actual output pattern produced by the input pattern p, $i_{pi}$ is the value of the ith element of the input pattern. Delta $\delta_{pj}$ is the "delta" value and is equivalent to $t_{pj} - o_{pj}$; this difference represents the desired output pattern value for the jth output unit minus the actual output value for the jth component of the output pattern. $\Delta_p w_{ji}$ is the change to be made to the weight of the connection between the ith and jth unit following the presentation of pattern p.

The solution for the values of $\Delta_p w_{ji}$ has been shown to be the inverse of one of a common type of optimization problems known as "hill climbing problems". A "hill climbing" problem can be characterized as the problem of finding the most efficient way to reach the "peak of a hill", which in mathematical terms represents a maximum value of a function. However, the inverse is to descend the hill and find a minimum value for that function. One common method for finding the $\Delta_p w_{ji}$ values is to show that the partial derivative of the error measure with respect to each weight is proportional to the weight change dictated by the delta rule (4), multiplied by a negative constant of proportionality, and solve that analogous derivative problem. The solution for the derivative problem corresponds to performing the steepest descent on the surface of a terrain in a weight space (i.e., descending the hill), where the height at any point is equal to the error measure corresponding to the weights. Thus, the weight adjustment problem can be thought of as an attempt to find the minimum error E in the equation:

$$E = F(w_o \ldots w_n) \quad (5)$$

for a given input pattern. The function F can be graphed to show a terrain of weight space points mapping the E value to the corresponding set of weights for a given input pattern in the neural network - this is the "hill". E represents the sum of the squared differences between the values of the actual output pattern and the desired input pattern. FIG. 1 graphs an example weight space for a neural network having only two weights, $w_1$ and $w_2$. To find the lowest value of E in the graph, the process is to look for the lowest point in the weight space terrain (i.e., the bottom of the hill). The gradient at any given point on the weight space terrain is the path of steepest descent to a minimum. The gradient descent method of solving the hill climbing problem is to find that steepest descending slope and follow it to a low point of the terrain. Because the gradient descent method provides a minimum solution of the derivative problem, the method also provides the proper weight change for the weights in a neural network. The derivative problem described above is proportional to the weight change dictated by the delta rule (4). Thus, where:

$$E_p = \tfrac{1}{2}\Sigma_j(t_{pj}-o_{pj})^2 \quad (6)$$

it can be shown that:

$$\frac{-\partial E_p}{\partial w_{ji}} = \delta_{pj} i_{pi}. \quad (7)$$

This second statement is proportional to the equation for $\Delta_p w_{ji}$, as stated by the delta rule (4) above.

Of general relevance to the learning method and apparatus presented by the present invention is the fact that the difficulty in solving the gradient descent problems varies between neural networks and depends upon the type of network architecture and activation function used. For example, where the neural network is arranged in the form of a two-layer network and the activation function for the units is linear (i.e., one that is capable of being represented by a straight line on a graph), the surface of the weight space terrain will be parabolic. The solution to the gradient descent problem for a parabolic surface terrain is easily found and gradient descent techniques are guaranteed to find the best set of weights for a given training input set, because it is easy to find the minimum for a parabolic surface.

When the architecture of the neural network is multilayered (i.e., including layers of hidden units), on the other hand, the terrain of the error space is not consistently parabolic. It has been shown that the graph of the weight space terrain for a multilayered network usually has a complex terrain surface with many minima. The lowest minimum values on the terrain represent solutions in which the neural network reaches a minimum error state at a value called a global minimum. The less deep minimum values are called local minima. FIG. 2 depicts a two-dimensional view of a weight space terrain with global and local minima. In such cases, gradient descent techniques may not find the best solution, if its slope of steepest descent points only to a local minima. However, it has been shown that in most cases it is not critical that a learning method using gradient descent techniques find a global minimum, so long as some minimum value is reached. As will be described below, however, it has been a particular problem to find any minimum value.

Additionally, in applying the delta rule to a multilayered network, it is often difficult to find the gradient that will enable the descent technique to operate when using certain activation functions. It has been shown that where the activation function used in the units of a multilayered neural network is a semilinear function, it is possible to find the partial derivative for the gradient descent method and to solve for $\Delta w_{ji}$ according to a form of the delta rule. A semi-linear function is defined as an equation in which the output of the unit is a nondecreasing and differentiable function of the total net output of the network. One commonly used semi-linear activation function is the logistic function:

$$o_{pj} = \frac{1}{1 + e^{-(\sum_i w_{ji}o_{pi} + \theta_j)}} \quad (8)$$

where $\theta_j$ is a bias that performs a function similar to the threshold function described above. A logistic function is defined to be one divided by the sum of one plus the natural number e exponentially multiplied to the power of a negative value. The use of this activation function is a multilayered feed-forward neural network is of general relevance because the present invention is particularly suited for such network architectures.

Presently, the commonly available techniques for performing gradient descent-type weight (i.e., "learning") adjustments have been limited to forms of a technique called backpropagation. Backpropagation is the process of taking, for a given training input pattern, the collective error (found by comparing the actual output pattern with a desired output pattern), propagating that error back through the neural network, by apportioning a part of it to each unit, and adjusting the weight value of each connection by the "delta" values found through application of the generalized form delta rule (7) mentioned above, i.e.:

$$\Delta_p w_{ji} = \eta \delta_{pj} i_{pj} = -\eta \frac{\partial E_p}{\partial w_{ji}} \quad (9)$$

The backpropagation technique has two phases. During an input phase, an input pattern is presented and propagated in a forward pass through the network to compute the output value for each unit in the network. An actual output pattern is then compared to a predetermined desired output pattern, resulting in a delta δ value error term for each output unit. For output units, the error is computed by the equation:

$$\delta_{pj} = (t_{pj}o_{pj}) f'_j(net_{pj}) \quad (10)$$

where $f_j(net_{pj})$ is the partial derivative of the activation function for the units in the network.

The second phase consists of a backward pass through the network during which the delta error terms are passed to each unit in the network and a computation is performed to estimate the portion of the total error attributable to a particular unit. For units in the hidden layers, it has been shown that the calculation of the delta value is:

$$\delta_{pj} = f_j'(net_{pj}) \sum_k \delta_{pk} w_{kj} \quad (11)$$

After computing the delta values for the output units as indicated above, the backpropagation technique then feeds the computed error terms back to all of the units that feed the output layer, computing a delta value for each of those units, using the formula above. This propagates the errors back one layer, and the same process is repeated for each layer with new delta values at each unit used to adjust the connection weights.

Studies have shown that the use of backpropagation techniques to solve the gradient descent problems presents a number of inherent difficulties. First, there is a slow rate of convergence, that is, finding of the local minimum. Studies have also shown that the rate of convergence tends tot slow down as a local or global minimum is approached. Moreover, following the gradient vector does not always lead to a global minimum (or even a local minimum), because it is possible that a backpropagation method could get "lost" on a plateau in the terrain.

Additionally, the current techniques of backpropagation have difficulty adjusting the learning rates. The learning rate is defined to be the step taken along the path of steepest descent (i.e., the gradient vector) or other path of convergence to arrive at a local minimum. The currently available backpropagation methods create only uniform steps toward the minimum.

One particular problem occurs in identifying the likelihood that the path of convergence along gradient is closely following another convergence path following a "ravine" in the weight space terrain. On the graph of the weight space terrain, it is common for the path of convergence to a minimum to roughly follow a long and narrow ravine in the terrain (such as an elongated quadratic surface). When the path of finding a local minimum follows the center line of a ravine instead of the gradient vector, the path of convergence can proceed at an extremely fast learning rate. However, the currently available gradient descent techniques are not equipped to identify the likelihood that the center line of a ravine is nearby, because the center line is not always the path of steepest descent at a given point. Those systems are blind, because they have no ability to recognize an identifiable approach to a minimum along a ravine and use that knowledge to take a greater learning step. Current techniques tend to zig-zag around the ravine, finding the local minimum only after much needless searching. If the currently available techniques could identify a ravine, the vector path toward the minimum could be adjusted to follow the ravine. Thus, there exists a current need for an improved gradient descent learning method that can more quickly find a global or local minimum for a given gradient vector and additionally adjust the gradient vector after identifying a ravine.

SUMMARY OF THE INVENTION

The present invention is directed to a multilayered, feed-forward (i.e., "bottomup") processing neural network using logistic activation functions to provide an improved method and apparatus for learning. In a training phase, the present invention provides an improved method for calculating the adjustments to the weights by a gradient descent method and apparatus that includes linear probing. First, the present invention finds a minimum by a recursive process that computes linear probes along the gradient in the direction of steepest decent in a terrain formed by the weight values of the neural network. The linear probing method of the present invention quickly identifies potential locations of minima and probes those areas to find them. In making the linear probes, the present invention computes the values of the output functions for all hidden layer units in a two-step process and stores these values for repeated linear probe computations, thus enhancing the efficiency of the learning method. Additionally, the values of ▲ w and the linear probe values are also stored and used to identify the likelihood that the convergence path is following the path of a ravine. To the extent that a path is likely following a ravine, the present invention adjusts the linear probe direction from the slope of steepest descent to a line that estimates the center line of the ravine. The method for identifying likely ravine paths takes advantage of the behavioral properties of the neural network by changing the direction of the linear probe in circumstances when there are repetitive occurrences of a very long linear probing step followed by a very short step (or vice versa). By taking into account the changes in successive gradient vectors, the present invention finds directions that are closely parallel to the center line of the ravine, and thus enables the linear probing process to take a very long learning step to greatly improve the convergence rate.

BRIEF DESCRIPTION OF THE FIGURES AND APPENDICES

FIG. 6B depicts an exemplary embodiment of the columns of the unit data table.

Figure 7A:
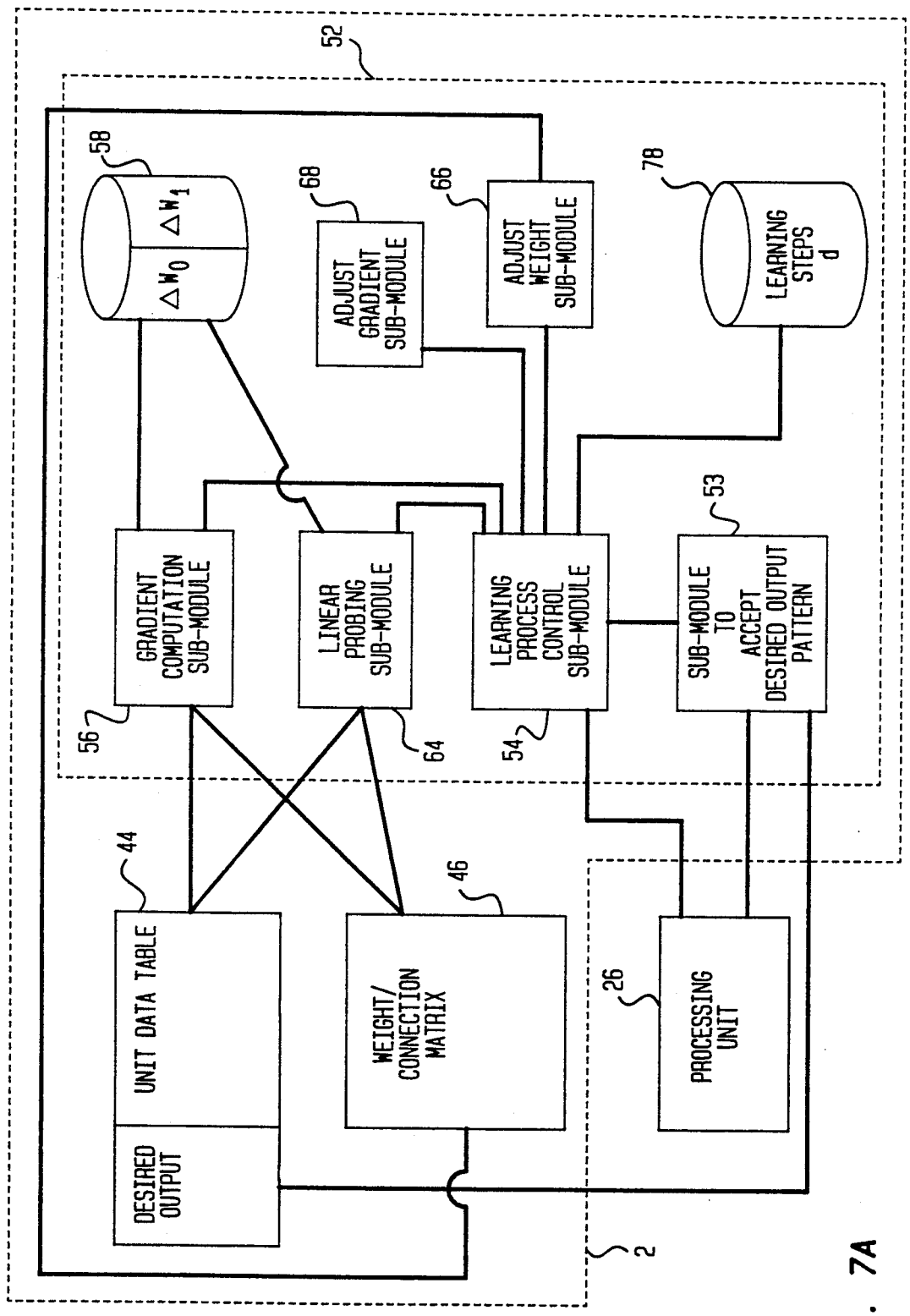
FIG. 7A depicts an exemplary computer hardware embodiment of the learning method of the present invention.
Figure 7B:
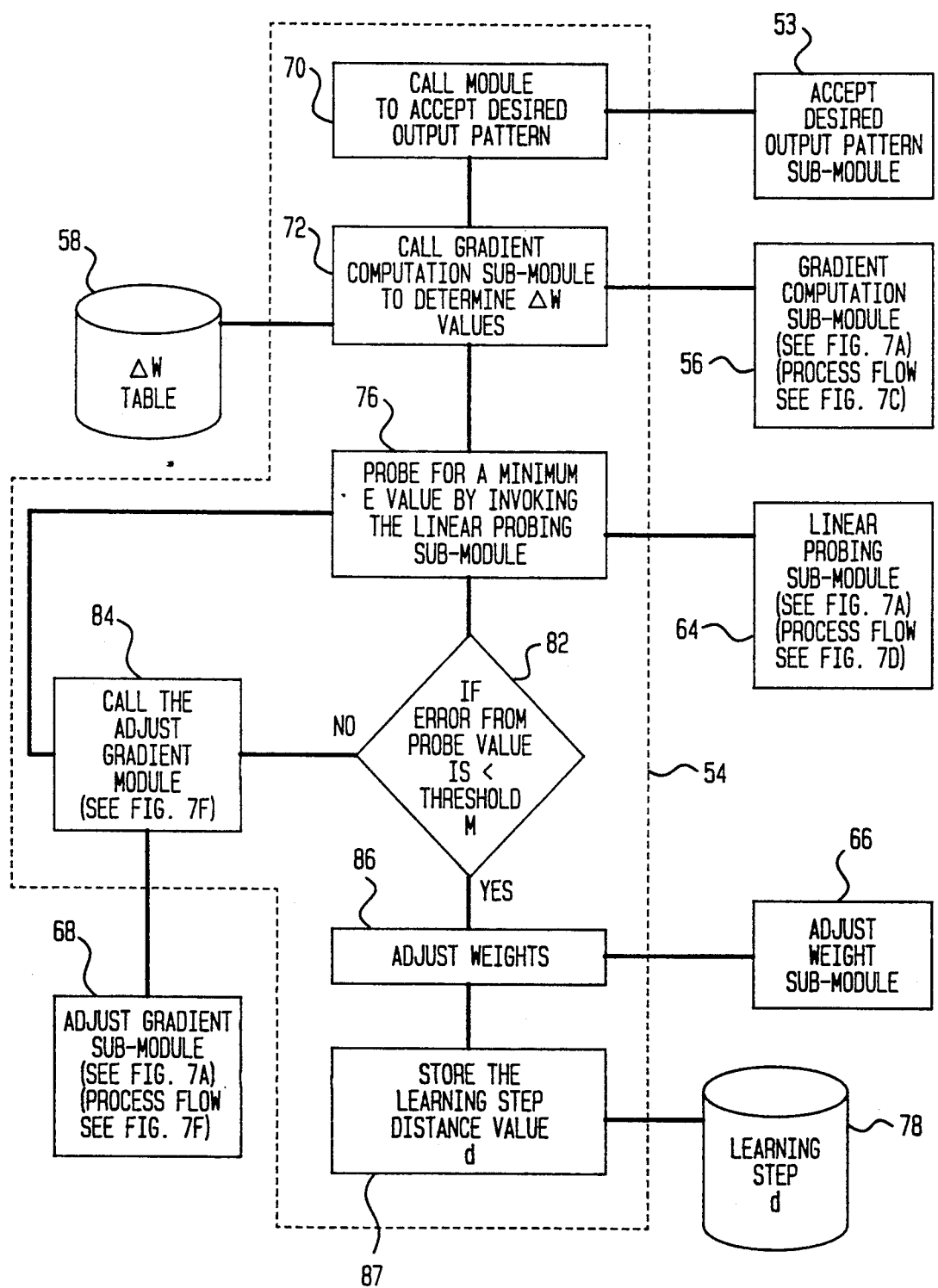
FIG. 7B depicts an exemplary process flow of a learning control submodule of the present invention.
Figure 7C:
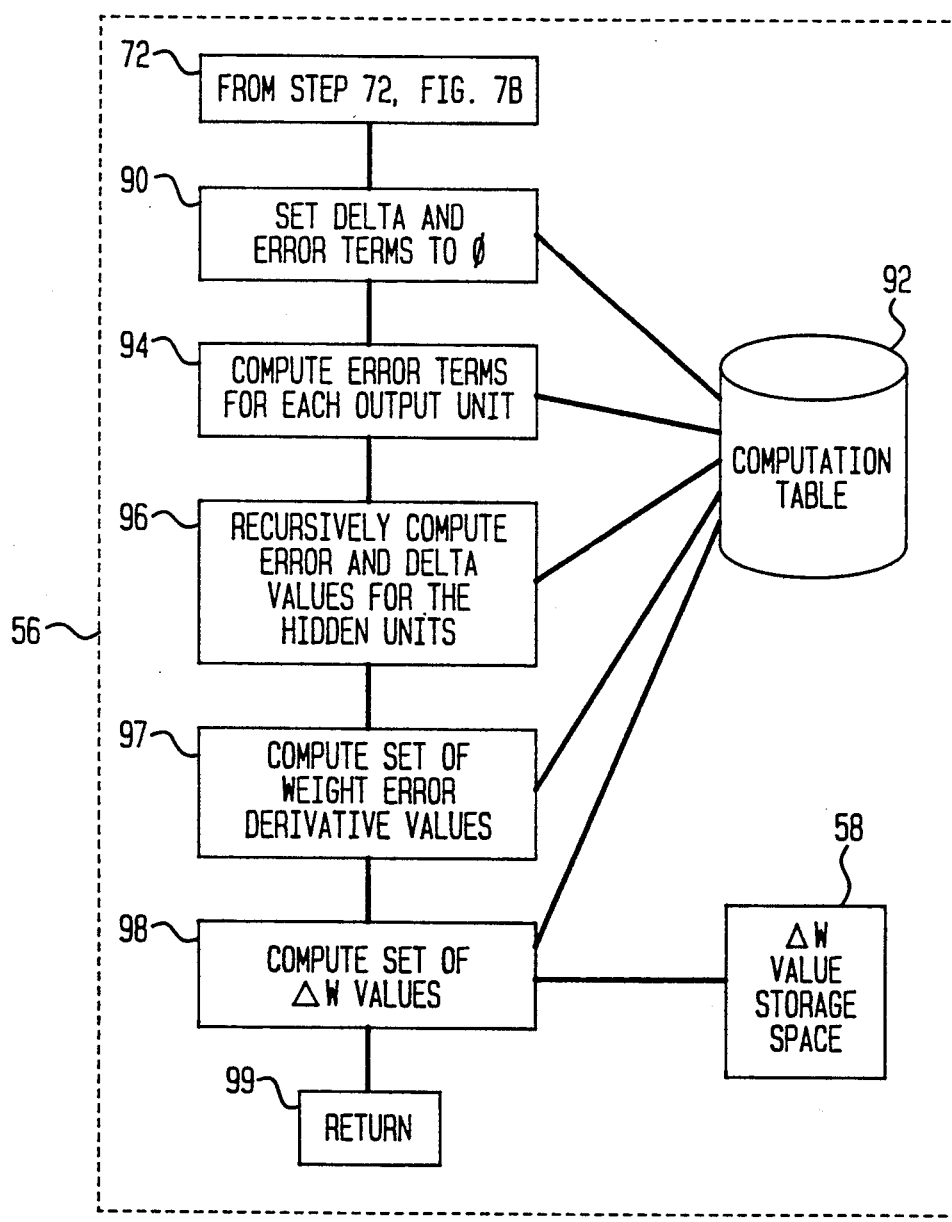
FIG. 7C depicts an exemplary process flow of a method of backpropagation used by the present invention to locate a gradient.
Figure 7D:
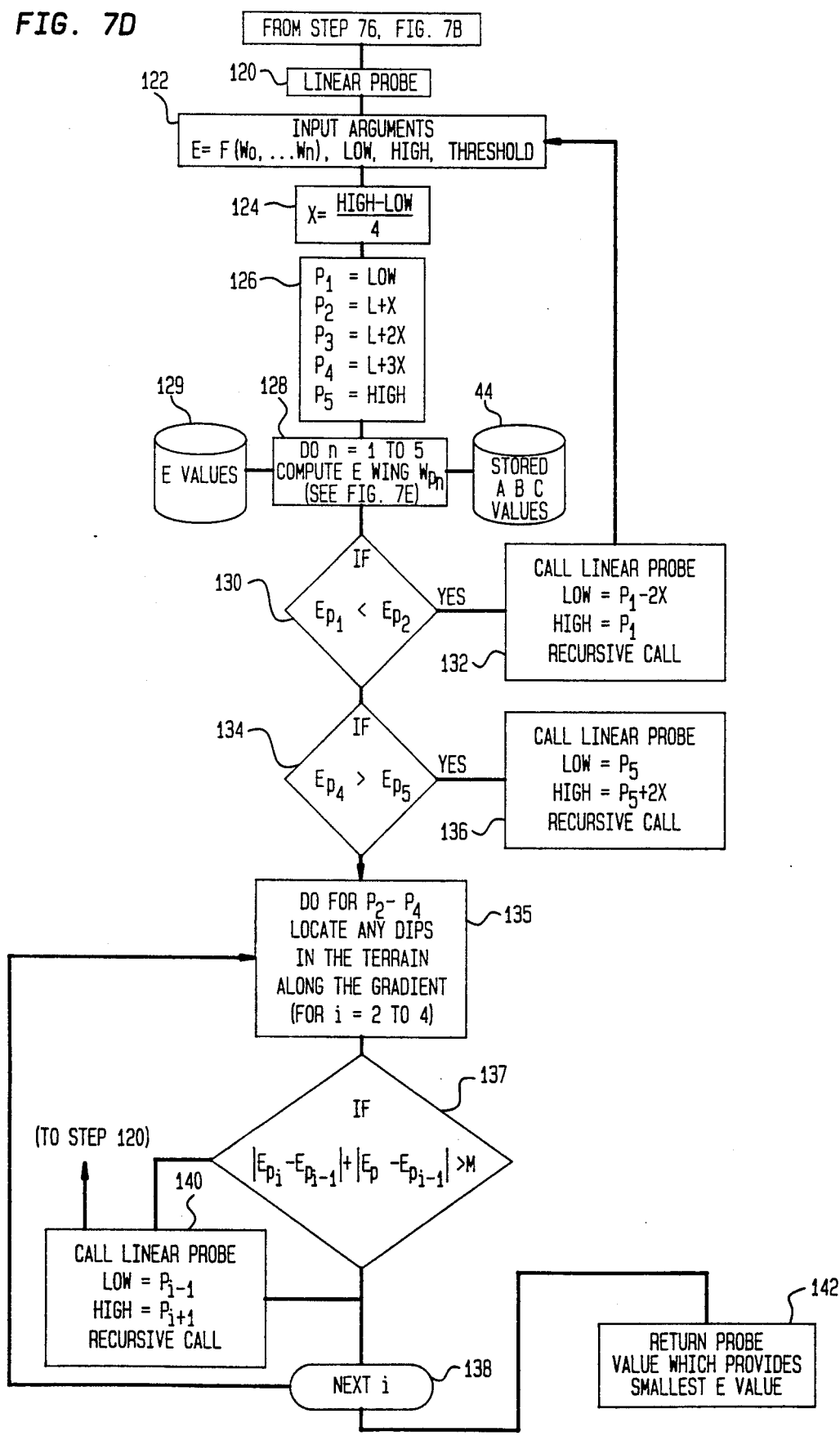
Figure 7F:
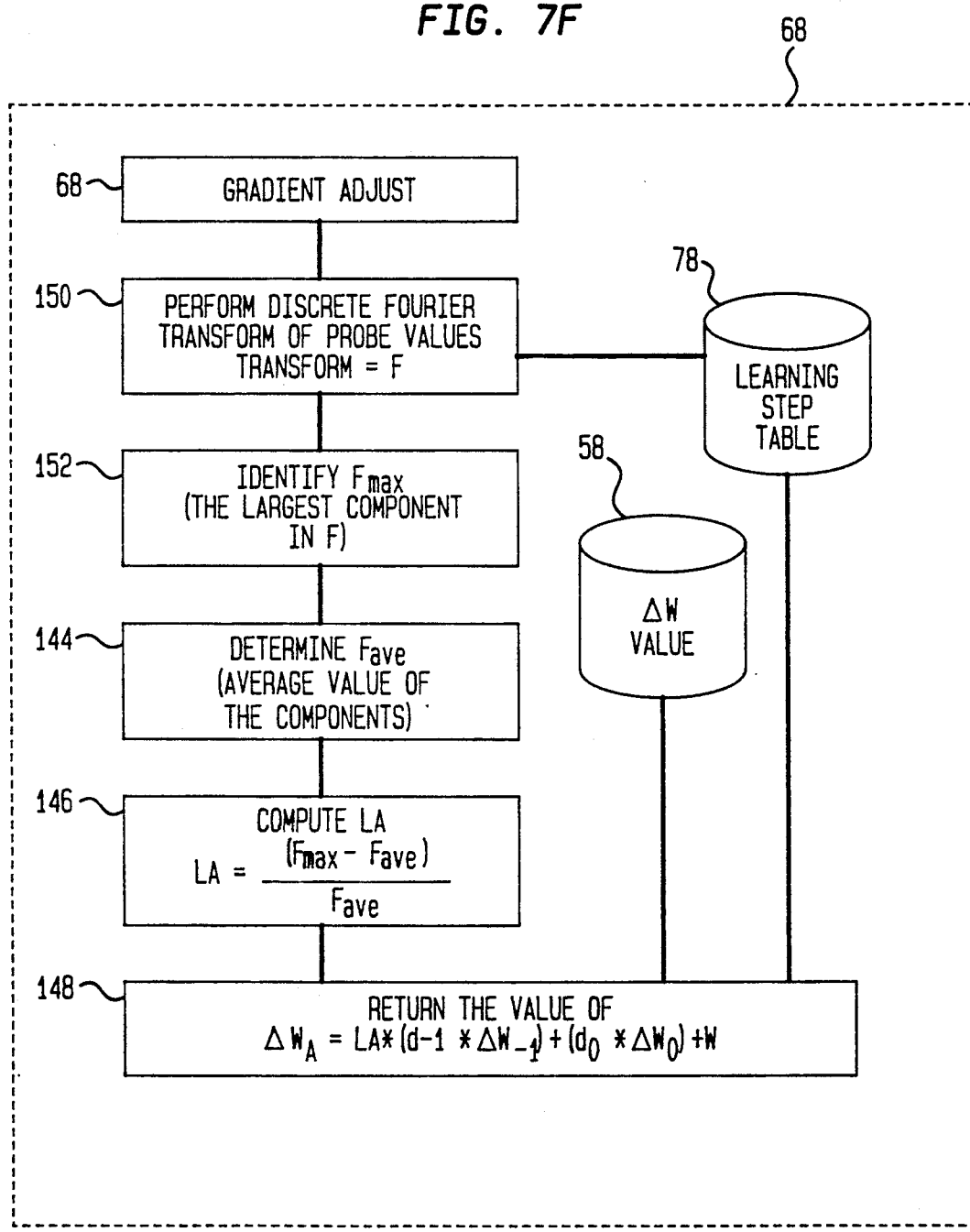

FIGS. 7D–7D' (herein called 70) depicts an exemplary process flow of a linear probe method used by the present invention;

FIG. 7E depicts an exemplary process flow of a two-step calculation for computing the error values in each probe pass in the present invention;

FIG. 7F depicts an exemplary process flow for a method to identify a ravine and adjust the gradient descent vector to follow the center line of the ravine.

APPENDIX I lists an exemplary source code for a backpropagation technique implemented in the LISP programming language;

APPENDIX II lists an exemplary source code for a linear probing algorithm of the present invention in the LISP programming language; and APPENDIX III lists an exemplary source code for gradient vector adjustment according to the present invention as implemented in the LISP programming language.

DETAILED DESCRIPTION

Figure 1:
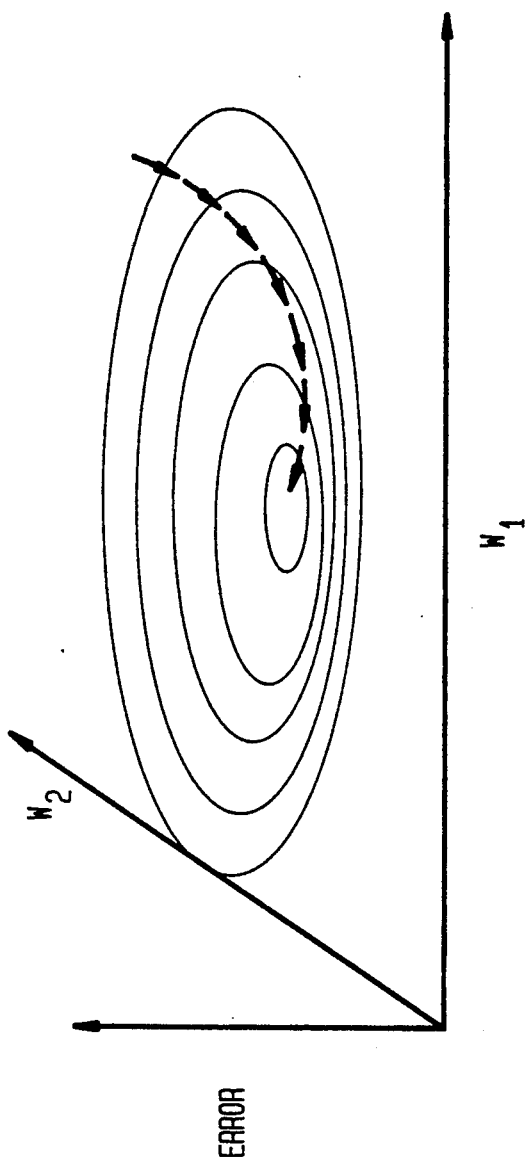
FIG. 1 depicts an example of a three dimensional weight space terrain of relevance to the prior art technique for finding minimum error states.
Figure 2:
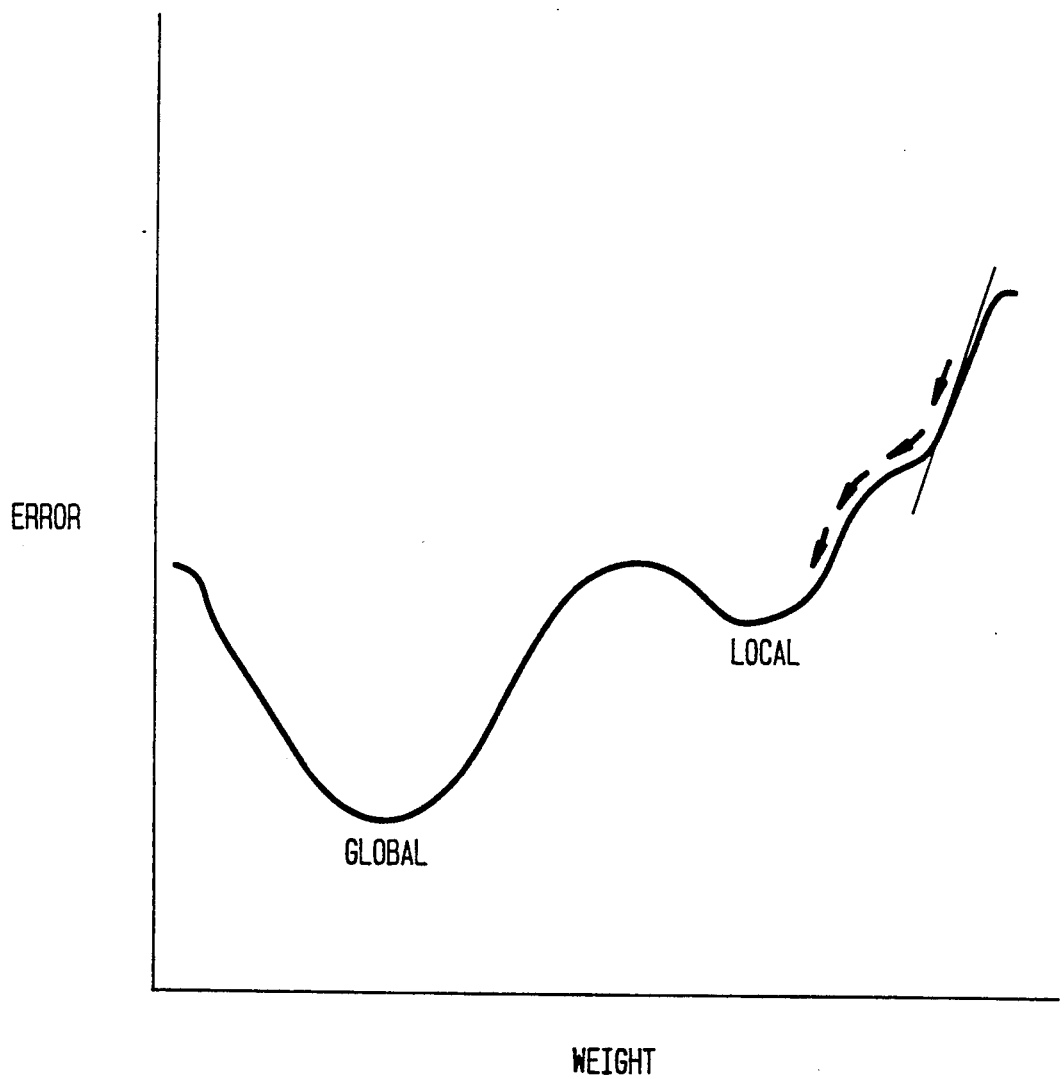
FIG. 2 depicts a two-dimensional view of a multi-dimensional weight space terrain with local and global minima of relevance to the prior art technique for finding global and local minimum error states.
Figure 3:
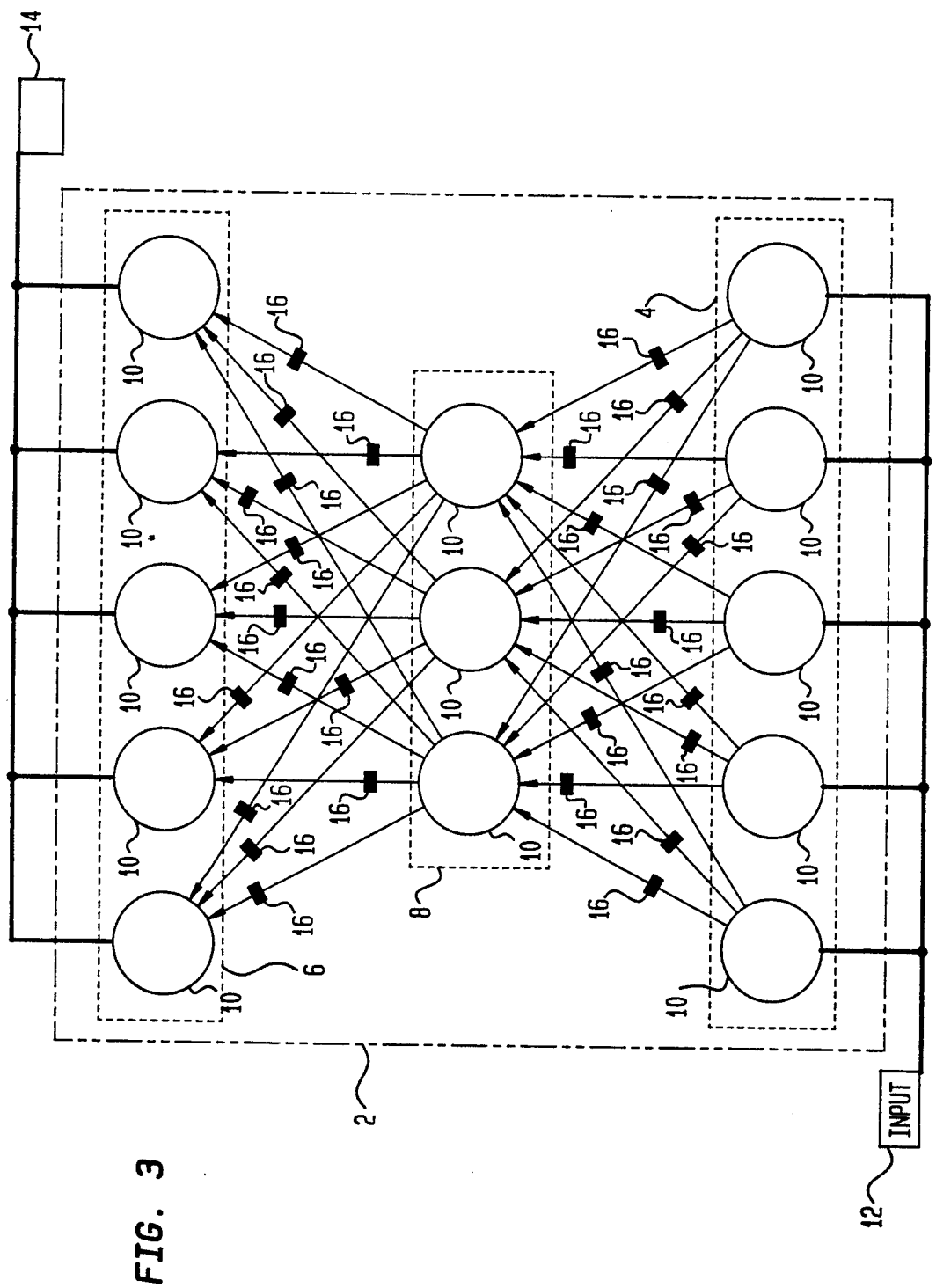
FIG. 3 depicts a representation of an exemplary multilayered, feed-forward neural network.

The present invention can be implemented for use with any multilayered, feed-forward neural network, using a logistic activation function. FIG. 3 depicts a sample representation of a multilayered, feed-forward neural network 2. Each layer 4, 6, 8 of the network comprises a plurality of artificial neuron units 10 (hereinafter "units"). An input layer 4 comprises a plurality of units 10 which are configured to receive input information from an input source 12 outside of the network 2. An output layer 6 comprises a plurality of units 10 that are configured to transmit an output pattern to an output source 14 outside of the artificial neural network 2. A plurality of hidden layers 8 comprising a plurality of units 10, accepts as input the output of the plurality of units from the input layer 4. The units 10 of the hidden layer 8 transmit output to a plurality of units 10 in the output layer 6. Associated with each interconnection between two units 10 in the neural network 2 is a weight function 16 to be applied to the output of the unit 10 that transmits data to the input of a subsequent unit.

Figure 4:
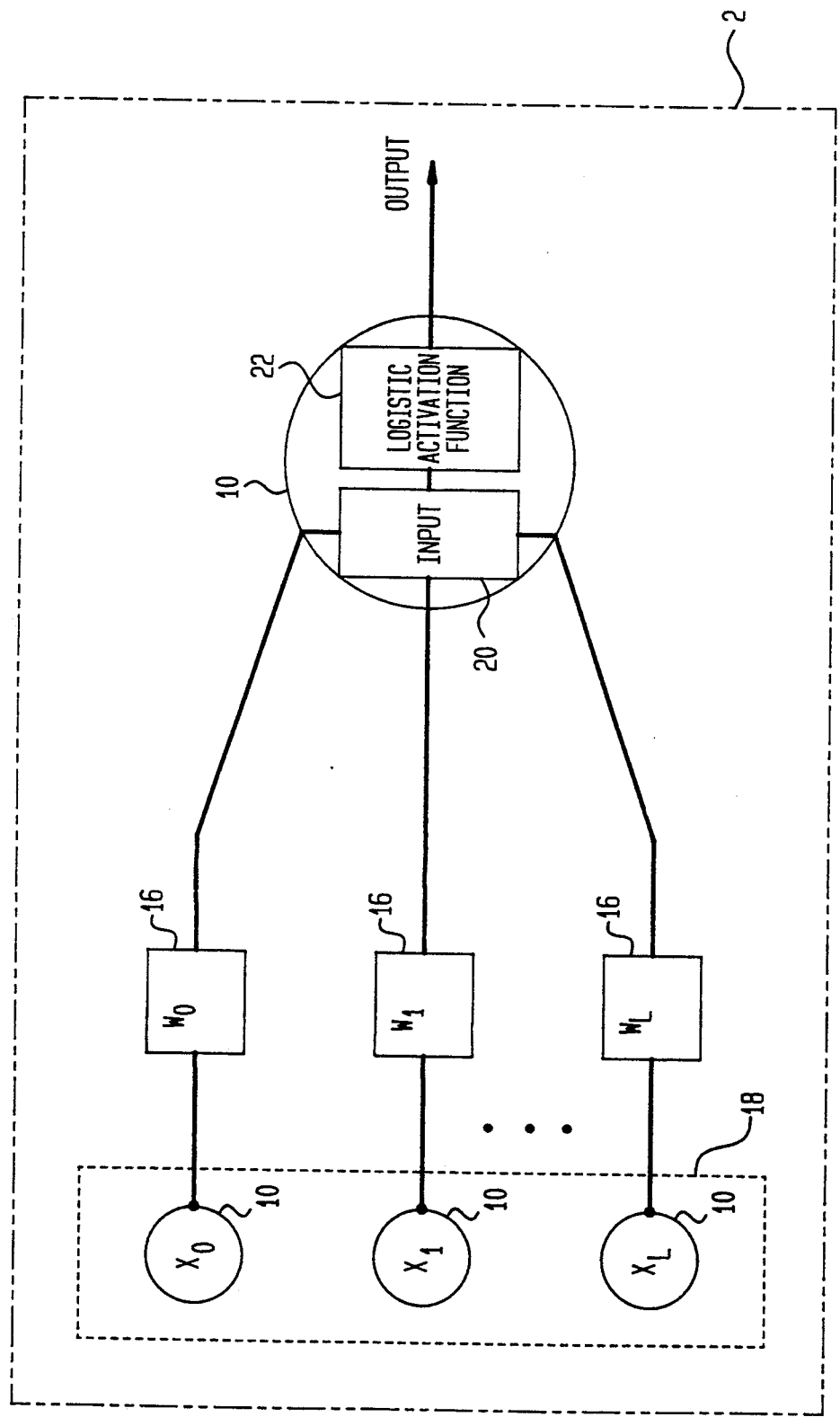
FIG. 4 depicts an exemplary processing unit in an artificial neural network that employs a logistic activation function.

A single unit 10 (from FIG. 3) and its corresponding input and output connections, with the associated weighting function, are presented in greater detail in FIG. 4. The figure shows a single unit 10 connected to inputs from three other units 10 in a layer 18. These input sources could be either other units 10 (FIG. 3) or an external input source 12 (FIG. 3). As the input from a source is first transmitted to the unit 10 along a specified connection, the input is first weighted according to a preselected weighting function 16. One common weighting function comprises a formula which simply takes the output and multiplies it by a numerical weight value that is usually set within certain bounds. The result of the weighting function for each input connection is then transmitted to an input connection of the unit 10. Each unit 10 comprises an input unit 20 to receive weighted inputs from its plurality of interconnections and an activation function application module 22. Although the present invention can be used with any logistic activation function, an exemplary embodiment is:

$$o_{pj} = \frac{1}{1 + e^{-(\sum w_{ji} o_{pi} + \theta_j)/T}} \quad (12)$$

where $W_{ji} o_{pi}$ is the output from a previous unit (such as $X_1$ in FIG. 4), received as input to the unit 10 after being adjusted by the weighting function 16 ($W_1$ in FIG. 4). $\theta_j$ (theta) is a threshold value. Each artificial neuron unit 10 in the neural network 2 will process input, using that activation function.

Multilayered neural networks have an infinite number of applications, performing such functions as sonar signal processing, speech recognition, data transmission signal processing and games such as chess or backgammon. For purposes of an exemplary embodiment, the present invention will use the improved learning method in an example apparatus: a handwriting analyzer. The general purpose of the handwriting analyzer is to translate handwritten words into typewritten text. Handwritten words such as a scrawled signature on a personal check or a handwritten address on an envelope can be presented to the handwriting analyzer. Configured to employ a neural network with improved learning capability, the apparatus will accept input information on the handwriting, process it, and output a decision as to what string of typewritten letters the handwriting is supposed to be.

Figure 5:
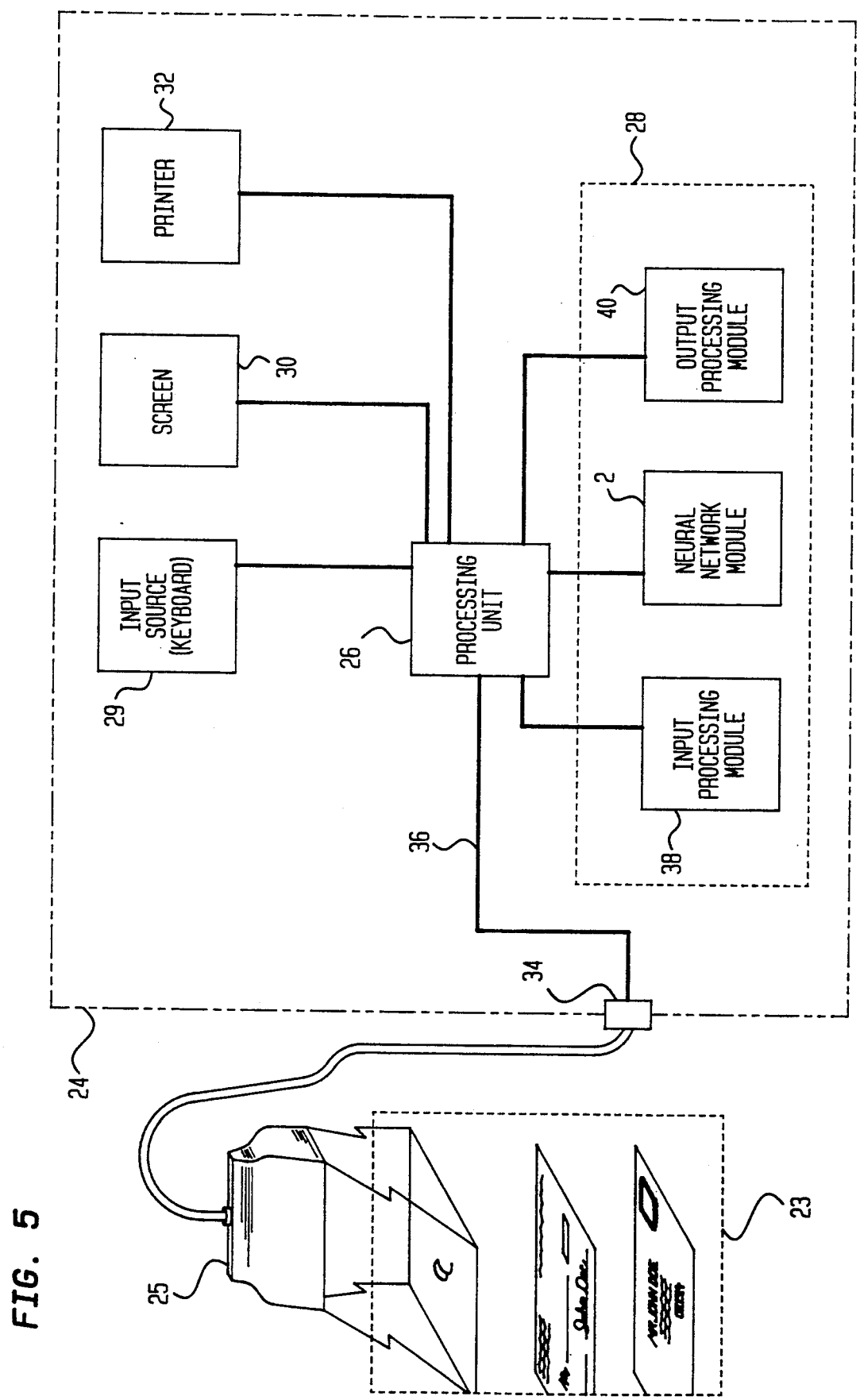
FIG. 5 depicts an exemplary hardware environment for implementing a multilayered, feed-forward neural network utilized as part of a handwriting analysis system.

FIG. 5 shows an exemplary embodiment of a system for handwriting analysis which employs a neural network 2 (FIG. 3) with the improved learning capability of the present invention. The system begins with a handwriting sample 23, such as a check, envelope—or simply the letter "a" on a piece of paper—and a means for electronically gathering electronic input on the handwriting, such as a scanning device 25. The scanning device 25 is coupled to a computer system 24, comprising a processing unit 26 coupled to a computer memory 28, an input device 29 (for example, a keyboard), and a plurality of output devices, such as a terminal screen 30 or a printer 32. The scanning device 25 is also coupled to the processing unit 26 and to the computer system 24 by a terminal connection port 34 and supporting computer hardware. The computer memory 28 comprises computer software statements and data structures organized as an input processing module 38, a neural network module 2, comprising a plurality of modules and data structures (which will be described in detail below) to simulate the neural network 2 of FIG. 3, and an output processing module 40. An exemplary embodiment can configure the processing unit 26 to perform parallel processing of the computer software statements and data structures in the memory 28.

To analyze the handwriting sample of the letter "a" 23, a user employs the scanning device 25 to input data concerning the handwriting sample. The scanning device 25 translates the letter on the page to electronic input and transmits the input as a series of signals to the computer system 24. The processing unit 26 accepts the signals and invokes the instructions in the input processing module 38 to convert the input into a form ready for processing by the neural network 2 (FIG. 3) as an input pattern. The processing unit 26 then executes the statements and data structures comprising the neural network 2, to map the input to an actual output pattern. The processing unit 26 then uses the executable statements and data structures comprising an output processing module 40 to translate the output into a form suitable for a display on a screen terminal 30 or a printer 32.

In a training mode, a user inputs a desired output pattern using an input device 29, such as a keyboard. The desired output pattern comprises a predetermined set of values that the input set (i.e., in this case, the scanned electronics signals on the letter "a") should map to. The desired output set serves as a comparison against the actual output set. The comparison is used to adjust the set of weights in a learning procedure that is described in detail below.

Figure 6A:
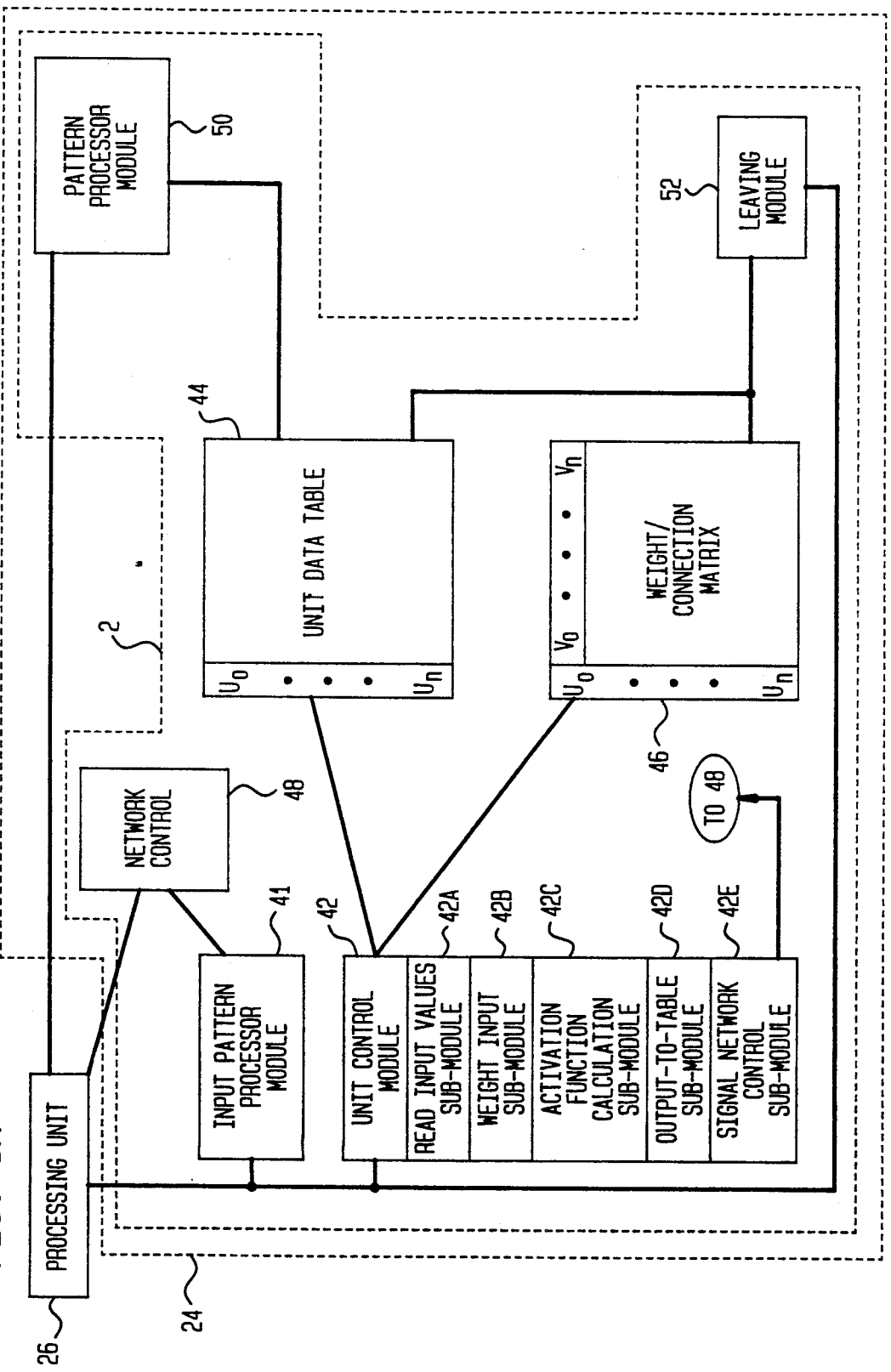
FIG. 6A depicts an exemplary hardware embodiment of the processing units of the neural network.

The executable statements and data structures that comprise the neural network 2 are depicted in more detail in FIG. 6A. The processing unit 26 employs a unit control module 42, comprising executable program statements, to perform the functioning of the artificial neural network units 10 and weighting functions 16, that were depicted in FIGS. 3 and 4. The unit control module 42 comprises a number of sub-modules. A read input values sub-module 42A gathers the input for each unit from a unit data table 44 (a data structure described more fully below). A weight input sub-module 42B, weights each input to a unit 10 FIG. 3 by multiplying the input value by a predetermined weight that is maintained on a weight/connection matrix 46 (a data structure described more fully below). Using these weighted input values, an activation function calculation sub-module 42C calculates the output for each unit 10 (FIG. 3), using a form of the activation function (12) described above. The output is stored for use in performing calculations for other units on the unit data table 44 by a unit output-to-table sub-module 42D.

FIG. 6B depicts an exemplary embodiment of the columns for entries in the unit data table 44 (FIG. 6A). The unit data table 44 comprises a data structure that is configured to store a set of data for each unit in the artificial neural network. In an exemplary embodiment, the unit data table 44 is a matrix where the following information would be stored for each entry. A unit identifier column 44A identifies all units comprising the neural network. A layer identification column 44B shows the layer to which each unit belongs. A raw input values data column 44C lists the input values received for a given input pattern and identifies the corresponding units from which the inputs come. An output column 44D contains the output value of each unit. For all output layer units, a desired output pattern column 44E shows the desired output values corresponding to each unit used in a training phase.

The weight/connection matrix 46 (FIG. 6A) comprises a data structure that in an exemplary embodiment is configured as an n-by-n matrix for a neural network of n units. Each slot in the matrix contains the weight value assigned to a connection between a given pair of units $u_i$ and $u_j$. A zero in any matrix slot at row i column j indicates that no connection exists between the units $u_i$ and $u_j$.

Referring again to FIG. 6A, an exemplary embodiment of the present invention configures the processing unit 26 to perform parallel processing. In such an embodiment, a plurality of unit control modules 42 (FIG. 6A) would exist to perform the calculations and table accesses as described above. In such an embodiment, a network control module 48 (FIG. 6A), comprising executable computer statements, would be invoked by the processing unit 26 to control the parallel processing of the plurality of unit control modules 42. In turn, each unit control module 42 would further comprise a signal network control sub-module 42E (FIG. 6A) to interface in parallel with the network control module 48. The network control module 48 comprises statements to perform the processing of the units layer-by-layer in "bottom-up" fashion until the calculation for units of the output layer are completed. The output pattern for the units of the output layer is then read by the processing unit 26 utilizing the executable statements comprising a pattern processor module 50 (FIG. 6A).

The pattern processor module 50 consists executable statements to process the output pattern of the neural network and put it in a form ready for use by a module outside of the neural network module 2 (FIG. 5) such as the output processing module 40 (FIG. 5).

Referring then to FIG. 5, the processing unit 26 invokes the executable statements comprising the output processing module 40 as depicted in FIG. 5, (which are external to the neural network module 2) to format the output pattern for representation on an output device such as the screen terminal 30 (FIG. 5) or the printer 32 (FIG. 5). In the exemplary embodiment of the neural network incorporated into a handwriting analysis system, the output to the screen terminal 30 or printer 32 would be the neural network's interpretation of the handwriting sample. Hopefully, the system would return a typewritten "a". However, it is possible that the neural network could return an incorrect answer such as a "t" or a "b". If so, then the neural network must be "trained" to recognize the input pattern as an "a".

Referring again to FIG. 6A, the present invention provides that the neural network 2 process input patterns in two phases of a pattern association-type learning method: training and run-time. In a run-time phase, the processing unit 26 invokes the executable program modules and data structures, described above to perform a "forward pass" of an input pattern through the neural network. As an input pattern is placed into the data table 44, by an input pattern module 41, the statements of unit control modules 42 ar e invoked to process the input pattern and an output pattern is created.

In a training phase, the set of weight values associated with the unit connections of the neural network are adjusted through comparisons of the actual output pattern of a particular input pattern against a desired output pattern for the same input pattern. The weights in the weight/connection matrix 46 are adjusted according to the gradient descent implementation of the delta rule (9) so that the actual output pattern matches the desired output pattern. In this way, as stated above, the network "learns" to recognize the input pattern. During the training phase, the processing unit 26 uses the executable program statements and data structures of a learning module 52 to perform the learning method of the present invention.

FIG. 7A depicts the sub-modules and data structures comprising the learning module 52 (FIG. 6A), and it also provides an overview of the elements of the learning process of the present invention. A learning process control sub-module 54 comprises executable statements used by the processing unit 26 (FIG. 5) to control the learning function. The learning process control sub-module 54 is connected to a sub-module 53 to accept the desired output pattern at the outset of the training phase. That data will be matched against the actual output pattern that was processed above and will provide the basis for adjusting the weight values of the neural network. In the example of the handwriting analyzer (depicted in FIG. 5), the input pattern would be the handwritten letter "a" and the desired output pattern would be a combination of signals such that the output processing module 40 (see FIG. 5) would determine that the signal was an "a". The desired output pattern is stored for use by the learning module 52 (FIG. 6A) in the unit data table 44 (FIG. 6A). With the desired output pattern and the actual output pattern ready for comparison, the processing unit 26 invokes the statements of the learning process control sub-module 54 (FIG. 7A) to oversee the execution of the linear probing method and ravine adjustment techniques that will enable the processing unit 26 (FIG. 5) to adjust the weights of the neural network 2 (FIG. 3).

The process flow of the learning process control sub-module 54 (FIG. 7A) is depicted in FIG. 7B. After the values of the desired output pattern have been collected in step 70 by invoking the module to the accept the desired output sub-module 53 (see also FIG. 7A), the next step 72 in the process flow of the learning process control sub-module 54 (see also FIG. 7B) is to compute the gradient (i.e., the direction of the steepest descent) for the weight space terrain by invoking, in step 72, the gradient computation sub-module (see also FIG. 7A).

FIG. 7C depicts an exemplary process flow of the gradient computation sub-module 56. The process for computing the vector ▲ w can be any method, including backpropagation techniques. The exemplary process flow for the gradient computation sub-module 56 using a backpropagation technique is shown in FIG. 7C. As stated above, the process of backpropagation involves the taking of the collective error of the neural network found at the output layer and propagating that error backward through the network to attribute each weight in the network with a portion of the collective error. The goal is to obtain a set of ▲ w values that can be used as a gradient vector in performing addition linear probes to determine a minimum error value.

Referring to FIG. 7C, processing begins by computing two values for each unit 10 (FIG. 3) in the neural network 2 (FIG. 3): error and delta. The error value for a unit 10 is equivalent to the partial derivative of the error with respect to a change in the output of the unit. The delta value for the unit is the partial derivative of the error with respect to a change in the next input to the unit 10. First, in step 90, the delta and error terms for all units are set to 0. A computation table 92 contains an error value and a delta value slot for each unit 10 (FIG. 3) in the neural network 2 (FIG. 3). These terms are initially set to 0. Then, in step 94, error terms are calculated for each output unit 10.

For the units in the output layer 6 (FIG. 3), error is the difference between the target and the value obtained using activation function of the unit.

The next step 96 is a recursive computation of error and delta terms for the hidden units (i.e., those units in the middle layer 8 (FIG. 3) of the neural network 2 (FIG. 3)). The program iterates backward over the units starting with the last output unit. In each pass through the loop, a delta value is set for the current unit, which is equal to the error for the unit times the derivative of the activation function. Then, once there is a delta value for the current unit, the program passes that delta value back as an error value to all units that have connections coming into the current unit; thus step 96 is the actual backpropagation process. By the time a particular unit 10 becomes the current unit 10, all of the units that it projects to will have already been processed, and all of its error will have been accumulated, so that when a particular unit is reached, it is ready to have its delta computed. After computing error and delta values, in step 97 a weight error derivative for each weight is computed from the deltas and inputs to a given unit 10. This weight error derivative is equivalent to the function:

$$\text{weight error derivative} = \frac{-\partial E_p}{\partial w_{ji}} \quad (13)$$

which corresponds to the derivative part of the generalized delta rule shown at (9):

$$_p w_{ji} = \eta \delta_{pj} i_{pj} = -\eta \frac{\partial E_p}{\partial w_{ji}} \quad (9)$$

The delta values are stored as mentioned above in the computation table 92, while the input to each unit is located in the unit data table 44 (FIG. 6A). Once the w values are stored in step 98 the processing, unit 26 returns to the process flow of the learning process control sub-module 54 at step 72 in FIG. 7B. Using the weight error derivative calculations, a set of ▲ w values is computed in step 98 by multiplying the weight error derivative for each unit by a constant of proportionality. In the exemplary embodiment the constant of proportionality can equal 1. Exemplary source code for a backpropagation technique, implemented in the LISP programming language is shown in Appendix I.

The set of ▲ w values computed for the weight space W for the given input pattern is saved in a ▲ w value storage table 58 (FIG. 7C). The ▲w value storage table 58 contains a set of all ▲ w values computed by the gradient computation sub-module 56 (FIG. 7A) for each unit on a given input pattern. As different input patterns are processed in a training phase, there will be many sets of ▲ w values computed. The ▲ w value storage table 58 will contain a list of all the ▲w values for a given input set saved as a vector, ▲$w_n$. As each different input pattern is processed, the ▲ w value storage table 58 will collect a historical record of the vectors (▲$w_o$, ... ▲$w_n$), with ▲$w_o$ being the most recent ▲w vector calculated. Each ▲ w vector has as its components the ▲ w values for each of the weights computed by backpropagation. As stated above, the w vector is a gradient representing the slope and direction of the steepest descent in a weight space terrain for the neural network at the point E=F($w_o$, ..., $w_n$). The weight space terrain comprises a set of points in a multidimensional space that maps, for a given input pattern, all possible weight values for the interconnections of the neural network against a set of all possible collective error values. The discussion of the present invention now provides a method for finding a local minimum in the weight space terrain by recursively probing along the path of the gradient vector ▲w for a given input pattern. A local minimum in the weight space terrain can be found by following a line with the slope and direction of the gradient vector to the local minimum. In doing so, a minimum E value in the equation:

$$E = F(w_o, ..., w_n) \quad (5)$$

can be found. As stated in Rumelhart, et al., true gradient descent methods require that infinitesimal steps be taken to arrive at the minimum. Thus, following a true gradient descent approach would be a computationally expensive proposition because at each new point thought to be a minimum, the value E=F ($w_o$, ..., $w_n$) must be computed, for all units and weights. Computing this new error value E means running the input pattern through the neural network, this time using a set of weights in the weight space terrain found at the probe point to calculate the sum of the squared differences between the actual and desired output pattern values. Current backpropagation techniques do little to speed the steps needed to arrive at a minimum. The present invention presents a method and apparatus to recursively probe along the line of the gradient to zero in on quickly potential minimum values. The method takes advantage of the features of the gradient to present a method that is able to identify quickly minimum values, and calculate the value E=F($w_o$, ..., $w_n$) in a manner that is far less computationally expensive than currently available methods.

Referring to FIG. 7A, the statements of the learning process control sub-module 54 will invoke the linear probing sub-module 64 to locate a minimum error value in the weight space terrain according to the method of the present invention. The linear probing module 64 fins the local minimum along a probing line that is initially the gradient vector in the weight space terrain, using the steps of the process flow depicted in FIG. 7D. An exemplary source code for a linear probing algorithm, implemented in the LISP programming language, is listed in Appendix II. The method is to locate one or more step values d taken away from point the starting point WE in the weight space terrain, which will be used with the ▲ w values, previously computed, to determine the error of the network system at points along the gradient. The starting point WE is a point in the weight space terrain whose location values equal $E = F(w_o, \ldots, w_n)$. Using the step values represented as probe points, the present invention determines a new set of W values at the new probe point, and computes new error values to be compared against a predetermined error threshold value M and adjusts the set of weights in the weight connection matrix 46 (FIG. 6A). Each d value is a number representing the distance along the gradient taken from the starting point WE. The d value is also indicative of the learning step. As stated earlier, a true gradient descent procedure requires that infinitesimal learning steps be taken along the path of steepest descent to locate the local minimum. However, with the learning method of the present invention, substantially larger steps can be taken.

In step 76 (FIG. 7B), the learning process control sub-module 54 calls the linear probing sub-module 64. The process flow of the linear probing sub-module is outlined in FIG. 7D. Referring to FIG. 7D, in step 120, the linear probing sub-module 64 receives four arguments: the activation function that will be used to compute $E = F(w_o, \ldots, w_n)$ (described more fully below); a pair of high and low values (H and L respectively), which represent boundary values for probing along the line of the gradient; and a probe threshold value T which acts as a condition to terminate operation of the method. The high (H) and low (L) values are each represented in terms of a distance away from the starting point WE along the gradient vector in the weight space terrain. The point WE comprises the current set of weight values and the error value computed in step 94 (FIG. 7C) above.

In an exemplary embodiment of the present invention, a set of 3 additional probe points equidistant along the gradient is selected using the high (H) and low (L) boundary values, in the following manner. First, in step 124 a scaling value X is computed by taking the difference between the high (H) and low (L) distance values and dividing them by four. This value X is used in step 126 to compute the middle three of the five probe points. In step 126, $P_1$ is the low (L) value represented as a distance away from the starting point WE along the gradient. To complete the middle three probe points, the low (L) value is added to the multiples of the scaling value; $P_2$ equals the low (L) value plus the scaling value X; $P_3$ equals the low (L) value plus two times X; $P_3$ equals the low (L) value plus three times X. The probe point $P_5$ is the high (H) value. Next, in step 128, for a set of weight values corresponding to each probe point, the input pattern will be remapped to compute a new set of actual output pattern values which is used to compute the new error E value by calculating the sum of the squared differences between the new actual output pattern values and the desired output pattern values. The goal is to locate a minimum E value as quickly as possible.

The method of the present invention utilizes the special properties of a multilayered, feed-forward neural network. A short discussion is now presented to describe the computational advantages of the present invention using logistic activation functions to quickly compute the E values for the probe points. As stated above, the activation function used in the present invention is a commonly used logistic function represented in vector notation:

$$o_{pj} = \frac{1}{1 + e^{-(dot(w_{pj}, o_{pi}) + \theta)}} \qquad (14)$$

A logistic function is a function defined as one divided by the sum of one plus the value of the natural logarithm base number e raised to the power of a negative value. In that function (14), the vector W represents the collection of weights of the input links to a unit. $O_{pj}$ represents the output for a given unit j of the network. In vector notation, each output is a function of the vector $O_{pi}$ representing the input to the unit j from preceding units, and the weight vector $w_{pj}$, representing the weights associated with the interconnections between unit j and its feeding units from the previous layer. Thus, the computation of the error value for each value for each new probe pass is simply a matter of taking a forward pass through the neural network with the new weight values and computing the sum of the squared differences between the actual and desired output pattern values. This function is used to compute the E (error) value for a set of w values along the gradient vector ▲ w at a point set by the probe points (either $p_1$, $p_2$, $p_3$, $p_4$ or $p_5$). The present invention provides that the probe values and ▲ w vector values can be incorporated into the activation function to take advantage of the fact that all the probe values computed on the same forward pass for a given input patern on the line of the gradient. Using vector notation, the activation function can be restated to incorporate the calculation of the output, using a probe point scalar value d along the gradient ▲w at the starting of the initial weights:

$$o_{pj} = \frac{1}{1 + e^{-dot(d^* \blacktriangle w_{pj} + w_{pj}, o_{pi}) - \theta}} \qquad (15)$$

In the re-stated equation, d is the step value taken in a given instance (i.e., the value of the probes $p_1$, $p_2$, $p_3$, $p_4$ and $p_5$) and ▲w a vector representation of the gradient. The "dot" is a vector notation to describe the inner-product of two vectors, d* ▲w, (which is the gradient vector multiplied by a scalar, and the initial set of weights represented as the vector W) and the vectors whose components are the input to each unit in the network.

The method of the present invention speeds the computatoins by breaking that equation into pieces and storing computed values for those pieces for use during successive calculations of the E values for each probe P. It can be shown that the function above can be transformed to:

$$o_{pj} = \frac{1}{1 + e^{-dot(\blacktriangle wpj, opi)} (e^{-dot(wpj, opi)})^d e^{-\theta}} \quad (16)$$

Utilizing this observation, parts of this function can be pre-calculated for repeated use in calculating new error values at each of the probe points in the following way: For all neuron units in a second layer of the neural network 2 (FIG. 3) (i.e., the units of a hidden layer that are connected to the input layer):

$$A = e^{-dot(\blacktriangle W_s, o_s - 1)} \quad (17)$$

$$B = e^{-dot(W_s, o_s - 1)} \quad (18)$$

$$C = e^\theta \quad (19)$$

are calculated once in step 128 by a process that will be described below with reference to FIG. 7E. For the first probe, the A, B and C values are calculated and stored in a pre-calculated storage table 129 (FIG. 7D). In the equations 17 and 18 above, $W_s$ represents a vector comprising all current weights connected to a second layer unit, $o_{s-1}$ represents a vector comprising the outputs of the previous layer to the second layer unit; (i.e., they are the inputs to each second layer unit) and $\blacktriangle W_s$ represents the gradient values for those weights. This method of pre-computing parts of the activation function provides substantial computational savings and speeds up the many computations that will be needed to compute the error values for each probe. Since it is quite common for the majority of the links in a neural network to be highly concentrated between the first and the second layers, the savings achieved with this method can easily reach several orders of magnitude, whereas the computation under the currently available methods requires many computations.

To understand the advance inherent in the method of the present invention, consider the computations required to obtain an output value at single second layer unit during an initial forward pass of the input pattern as compared with the forward pass for a new output pattern using a probe value. In either case, the computation of an output for a second layer unit requires several computations by the processing unit 26 (FIG. 5) for each weighted input in computing values with the activation function (14) descibed above. Assume that there are N input units and each second layer unit is connected to receive N weighted inputs - one from each input unit. If so, the computations required to determine the value of the exponent to which the power of e will be raised requires N multiplication operations and N summation operations. Additionally, the value of e raised to the power of the exponent would have to be determined in an operation (one operation); that result would have to be added to 1 to complete computation of the denominator (one more operation) and finally the numerator 1 would be divided by the resulting denominator. Thus, for each second layer unit during a forward pass, the following operations are required: N multiplications, N+1 summations, one exponent determination operations for e, and one division operation.

Thus, the thought of computing E values for at least five probes (and possibly many more) could, like the other currently available methods, make the learning method of the present invention very slow. However, the method of the present invention shows that since all of the probes computed during the same pass are on a straight line, significant savings in computation time can be achieved by exploring the special properties of the logistic function (14) commonly used in most multi-layered, feed-forward neural networks. During a single linear probing pass in the present invention, only the value d for each probe point ($P_{1-5}$) is changed, and thus computing the error valued using precalculated A, B and C values requires only one division operation, one addition operation, one exponent determination operation, and one multiplication operation for each of the second layer units - a substantial savings over the N+ operations required in the initial forward pass.

The savings provided by the method of the present invention can also be shown in another way. Assume that S is the number of units in the second layer of a neural network, each unit having interconnections to the input layer units. Where one input pattern is provided during the training phase, the number of operations performed in computing outputs for all second layer units can be compared between the initial forward pass at the input and the pass to compute the error E with probe point as follows:

|  | Input Forward Pass | During Probe Point E Computation |
| --- | --- | --- |
| Exponents | O(S) | O(S) |
| Multiplications | O(SI) | O(S) |
| Additions | O(SI) | O(S) |
| Divisions | O(S) | O(S) | where O() is a function that represents the order of magnitude of computing complexity. S represents the number of second layer units and I represents the number of input connections to each second layer unit. The present invention provides a saving on the order of magnetidue of I in terms of both the multiplication and addition operations. This savings is substantial. For example, referring again to FIG. 5, in the exemplary embodiment of the present invention as a handwriting analysis system, an input picture of the handwriting, taken with the scanning device 25, might consist of a 20×30 pixel image. The neural network 2 (FIG. 3) would be configured to have an input layer (FIG. 3) of 600 units, one unit for each pixel. If each second layer unit is connected to each unit of the input layer (as is typical), then the I value above would be 600 and the savings presented by the present invention would be on the order of 600 times S, the number of second layer units.

Referring again to FIG. 7D, in step 128 the present invention calculates the error value of the neural network 2 for a weight space at each of the five probe point values. The process flow for step 128 is depicted in FIG. 7E. Referring to FIG. 7E, the method beings in step 101 by accepting arguments comprising a probe point value and the gradient vector w and the weight set values W. Additionally, a first probe flag is sent to control the computations for the second layer units. In step 110, a loop begins to compute the output of each unit using the new weight values at the inputted probe point. The processing unit 26 begins looping through the units, accessing information for each unit from the unit-data table 44 (see FIGS. 6A and 6B). In step 112, the processing unit 26 (FIG. 5) determines whether the unit is a second layer unit by checking the layer identification slot 44B (FIG. 6B) in the unit data table, 44. If the unit does not lie in the second layer, then the processing unit 26 proceeds to step 116 and calculates an output value for the unit in one step according to the function $$o_{pj} = \frac{1}{1 + e^{-dot(d^* \Delta w_{pj} + w_{pj}, o_{pi}) - \theta}} \quad (15)$$

With the output for the non-second layer unit computed in step 116, the processing unit 26 proceeds to step 122 and stores the output on the unit data table 44. In step 127 the processing unit 26 will return to the beginning of the loop at step 110, and perform the process for another unit.

Returning to step 112, if the current unit is a second layer unit, there are two phases to further processing: a first and subsequent probe phase. In step 114, the probe flag is read to determine whether this computation is the first probe along the gradient. If this is a first probe attempt, the processing unit 26 then proceeds to step 120 to calculate the values for A, B, and C, using the formulas (16), (17) and (18) listed above. In step 121, the A, B and C values are then stored in an ABC value table 44. The processor next proceeds to step 118 to calculate the output for the second layer unit using the formula:

$$o_s = \frac{1}{1 + A(B^d)C} \quad (20)$$

where the d value is the probe point whose value is represented as a distance between the starting point WE and the probe point. In step 122, this output for a particular unit is added to the total output. In step 124 the processing unit 26 will return to the beginning of the loop step 110 and the processing will continue for all units in the neural network.

Returning again to step 114, if the first probe flag is false, then the processing unit 26 determines that this is not a first probe attempt and the processing unit will proceed to calculate the output for the current second layer unit using the previously stored values in the ABC value table 44. In step 119 the processing unit 26 retrieves the ABC values from the ABC value table 44 and in step 118 calculates the output using the function (20).

Upon completion of the loop, in step 110, the processing unit 26 has computed an actual output set for the set of weight values at the probe point P. In step 125, the error value is found by computing the sum of the squared differences between the actual and desired output values. In step 133, the error value for the probe point is returned to step 128 in FIG. 7D.

Referring again to FIG. 7D, the error values for each probe point are computed using the process flow of FIG. 7E and the values are stored in an error value table 129. In steps 130 - 138, the processing unit 26 now examines the error values returned from the procedure illustrated in FIG. 7E to determine whether further probing is necessary. In step 130, the processing unit 26 compares error values for further recursive processing. If the error value calculated at the probe point $P_1$ (i.e., the low probe value) is less than the error value of probe $P_2$, local minima might lie below the preselected low probe value on the line of the gradient. If the processing unit in step 130 makes that determination, the method of the present invention, in step 132, will search beyond that low point, by recursively reinvoking the linear probe algorithm, setting the high value of the probe to be the previous low value and the new low value to be the old value minus two times the X (scaling) value.

After the comparison in step 130, the processing unit 26 will also examine, in step 134, the E vaues for the high probe value and the value of the immediately adjacent probe point. If the error value of $P_4$ is greater than the error value of $P_5$, it can be inferred that a local minimum may lie beyond the predetermined high (H) value. If so, the processing unit 26, in step 136, will probe past the previous high point by recursively calling the linear probe algorithm, using as the new low value, $P_5$ (the previous high value) and a new high value, (i.e., $P_5$ plus two times the X scaling) value).

After the high and low probe comparisons in steps 130 and 134, the processing unit 26, in step 135, begins a small loop to determine whether the probes have encountered any "dips". A dip is any point where the error value of a given probe $P_i$ is smaller than the error values of the probes $P_{i-1}$ and $P_{i+1}$ that are immediately adjacent to it. A dip is an indication that a local minimum lies between the probes $P_{i-1}$ and $P_{i+1}$. However, the method of the present invention will probe beyond into a dip location only if it can be shown that the benefits of further processing outweigh the resulting computational expense. If the dip is too shallow, it is not worth processing any further. In step 135, the processing unit 26 selects one of the middle probe points (i.e., neither the high nor low points) and in step 137 makes a determination as to whether it should process further by performing the following computation:

$$|E_{pi} - E_{p-1}| + |E_{pi} - E_{pi+1}| < T \quad (21)$$

The value $E_{pi}$ is the error value corresponding to the currently examined middle probe point and the values $E_{p-1}$ and $E_{p+1}$ correspond to the probe points immediately adjacent to the probe point in question. If the sums of the differences of those errors is less than a preselected value T, then the processing unit 26 determines that it is not worthwhile to perform further probe processing. If so, the processing unit 26 will proceed to step 138 and return to the top of the loop (step 135) to make the same determination with another middle probe value.

At step 137, if the processing unit 26 determines that the function (20) is greater than the threshold value T, then the processing unit 26 will in step 140 recursively call itself using as new high and lows the values $P_{i-1}$ and $P_{i+1}$. When the recursive process is completed the processing unit will proceed to step 138 and return to the top of the loop in step 135 to process another middle probe value. Upon completion of the loop, the processing unit 26 in step 142 will evaluate the collected error values and corresponding probe points. Through the recursive calls the E value table 129 will contain many values. In step 142 the processing unit 26 will return to the smallest E value and its corresponding probe point. The processor returns to step 76 in FIG. 7B.

Referring to step 82 in FIG. 7B, the processing unit 26 evaluates the returned error value (from FIG. 7D) against a pre-determined error threshold. If the error value is below the threshold, then the processing unit, in step 86, replaces the set of interconnection weights currently stored in the weight/connectivity matrix 46 (FIG. 6A) with the set of weight values corresponding to the probe point associated with the low error value. In step 87, the processing unit 26 stores the probe point, represented as a distance away from the starting point along the gradient, in a learning step storage table 78. After that, the processing of the learning module is complete and the control would return to the unit control module 42 (FIG. 6A).

However, returning again to step 82 in FIG. 7B, if the error value returned from the linear probe is not below the error threshold value M, in step 84 the processing unit 26 invokes an adjust gradient sub-module 68 (see also FIG. 7A) to dynamically change the direction of the linear probe line. It is common for the path of convergence to go down a long and narrow "ravine" (such as an elongated quadratic surface). Under such circumstance, the repetitive occurrences of a very long linear probing step followed by a very short step (and vice versa) can be observed. This is an indication that the learning path has gone very near to a path that may lead to extremely fast convergence. By taking into account the characteristics of successive gradient vectors, it is possible to find directions that are closely parallel to the center line of the "ravine" thus enabling the linear probing method to take a very long learning step and greatly improve the convergence rate.

In the method of the present invention a procedure is presented to identify the likelihood that a ravine-like terrain; and the probe values previously computed with the linear-probing method are used to accomplish the direction adjustment (as opposed to simply using the result of the previous back-propagation step as in the prior art). The method of the present invention is to modify the current gradient vector using the gradient sets previously stored in $\blacktriangle w$ value file 58. In the method of the present invention, the length of the successive gradient vectors are automatically taken into consideration as well as successive learning step values to improve the result.

FIG. 7F depicts the process flow of the adjust gradient module 68. Appendix III lists exemplary source code for the gradient vector adjustment technique of the present invention implemented in the LISP programming language. In step 150, the processing unit accesses the historical learning step data stored in the learning step table 78 and determines the periodicity of the values in the learning step table 78, searching for sequences of a long step followed by a short step. In an exemplary embodiment, the present invention uses a discrete Fourier transform to examine periodicity. The processing unit 26 performs, in step 150, a discrete Fourier transform 140 on the probe values that were previously stored in the learning step table 78. A discrete Fourier transform is a mathematical tool used for the study of periodic phenomena, such as the study of light and sound wave motion. In principle, any mathematical method that detects periodicity may be used here. The application of a discrete Fourier transform on the d values stored in the learning step table 78 yields, in step 150, a set of F values. The output of the transform is a vector F having components $F_0, F_1, \ldots F_n$, each F value corresponding t thnumber of learning steps stored in the learning step table 78. In step 152, the processing unit 26 identifies an $F_{max}$ value - the largest component in the F vector. In step 144, the processing unit 26 determines a value $F_{ave}$ - the average value of the components. The method provided by the present invention uses the $F_{max}$ and $F_{ave}$ values to determine whether the current terrain is like a ravine or appears to be "water-slide-like." In step 146, a third value LA, is computed. The value, LA identifies the degree to which the current terrain for the given weights appears to be a ravine. Using this weighting value LA, the processing unit 26, in step 148, next applies it to the current gradient vector $\blacktriangle w$ (or other vector if the gradient was previously adjusted). The adjusted $\blacktriangle w$ vector equals:

$$\blacktriangle w_A = (LA \cdot d_{-1} \cdot \blacktriangle w_{-1} + d_o \cdot \blacktriangle w_o) + w$$

In performing the calculations in step 149, the processing unit uses the current d (probe point) (corresponding to the lowest E value returned from the linear probing sub-module 64 (FIG. 7B) at step 76 (FIG. 7B) of the process flow for the learning process control sub-module 54 (FIG. 7A)), and $\blacktriangle w$ values as well as the previous d and $\blacktriangle w_o$ values. This adjustment allows the next-linear probing steps to travel further, and hence the neural network learns faster. In step 148, the new probing vector $\blacktriangle w_A$ is returned to step 84 in FIG. 7B.

With the newly adjusted probe line (formally the gradient), the processing unit 26 returns to step 76 (FIG. 7B) to perform the linear probing process outlined in FIG. 7D. That process will again return an error value and a new probe point value which will be compared in step 82 against a threshold value M. If the value is lower than the threshold value M, the processing unit 26 will adjust the weights in step 86 and store, in step 87, the value d of the probe point. Otherwise, the processing unit 26 will again, in step 84, invoke the probe line adjustment procedure until a suitable error value is reached.

The neural network will continue processing in the fashion described. The above described exemplary embodiment of the invention is meant to be representative only, as certain changes may be made without departing from the clear teachings of the invention. Accordingly, references should be made to the following claims which alone define the invention.

Digital Equipment Corporation

Appendix 1. Exemplary source code for back propagation

BEST AVAILABLE COPY

```
;;;
;;; Back Propagation
;;;
(defun back-propagation (net &aux delta-w)
    (incf *bp-count*)
    (map-nodes net (setf (node-delta node) ()))
    (dolist (node (top-level-nodes net))
      (get-delta node T))
```

```
      (dolist (layer (reverse (butlast net)))
        (dolist (node (layer-nodes layer))
          (get-delta node)))
      (dolist (layer (reverse (butlast net)))
        (dolist (node (layer-nodes layer))
          (dolist (link (node-output-links node))
            (incf (link-d-weight link)
                  (compute-delta-w link))
)))))

;;
;; Compute Delta Value
;;
(defun get-delta (node &optional (is-top-level nil))
    (or (node-delta node)
        (setf (node-delta node)
              (cond (is-top-level
                     (*
                       (- (node-expected-value node) (node-value node))
                       (a-prime node)))
                    (t (delta-sum node))))))

;;
;; Compute delta weight for each link
;;
(defun compute-delta-w (link &aux child-node)
  (setf child-node (link-child link))
  (* *learning-rate*
     (get-delta (link-parent link))
     (node-value child-node)
))
```

Appendix II Exemplary source code for linear probing

```
;;
;; This is my version of a Neural Network with the linear-probing
;; algorithm.
;; Call (train) to activate a standard BP learnging process.

;;
;; Data structure definitions.
;;
(defstruct node
  input-links output-links
  (value 0.0) old-value index expected-value
  delta
  e-WiXi e-delta-WiXi
  (bias 0.0)
  (activation-function ()))

;
; a D-WEIGHT of zero indicates "hard" link that cannot be changed.
;
(defstruct link
  (weight 5.0)  child parent
```

```
       (d-weight-1 0.0)
       (d-weight-2 0.0)
       (d-weight 0.0))

(defstruct layer nodes child parent)

(defmacro activation-function (arg)
  `(let ((x ,arg))
     (declare (single-float x))
     (cond ((> x 88.0) 1.0)
           ((< x -88.0) 0.0)
           (t (/ 1.0 (+ 1.0 (expt 2.71828 (- x)))))))))

(defun a-with-e (e)
   (declare (single-float e))
   (/ 1.0 (+ 1.0 e)))

(defmacro activation-function2 (arg)
   `(let ((x ,arg))
      (declare (single-float x))
      (cond ((> x 88.0) 0.0)
            ((< x -88.0) 9.0e37)
            (t (expt 2.71828 (- x))))))
;;
;; Propagation functions
;;
(defun propogate-1-layer (layer)
    (dolist (node layer)
       (propagate-1-node node)))

(defun compute-1-node (node &optional d project-p)
   (cond (project-p
             (if T  ;(null (node-e-delta-WiXi node))
                 (setf (node-e-delta-WiXi node)
                       (activation-function2
                          (compute-weighted-sum
                              (node-input-links node) 'd-weight))))
             (setf (node-value node)
                   (activation-function
                     (compute-weighted-sum (node-input-links node) 'all d)
;                    (a-with-e
;                      (* (activation-function2 d)
;                         (node-e-WiXi node))
                   )))
          (t (setf (node-e-WiXi node)
                   (activation-function2
                      (compute-weighted-sum (node-input-links node) 'weight)))
             (setf (node-value node)
;                  (funcall (node-activation-function node)
;                      (compute-weighted-sum (node-input-links node) d))
;                  (funcall (node-activation-function node)
;                          (+ (node-e-WiXi node) (node-bias node))
;The following is wrong if bias is non-zero
                   (a-with-e (+ (node-e-WiXi node) (node-bias node)))
))))
```

```lisp
(eval-when (compile eval load)
  (if (is-vaxlisp) (defvar temp-float (system::%sp-alloc-fflo))))

(setf temp-float 1.0)

(defun compute-weighted-sum (links &optional type d)
 (let ((sum (if (is-vaxlisp) (system::%sp-alloc-fflo) 0.0)))
    (declare (single-float sum))
    (dolist (link links)
      (setq sum
       (my-+ sum
          (case type
            (all
              (my-* (my-+ (my-* d (link-d-weight link))
                          (link-weight link))
                (link-child-value link)))
            (weight
                (my-* (link-weight link)
                      (link-child-value link)))
            (d-weight (* (link-d-weight link) (link-child-value link)))
))))
   sum))

(defun compute-1-layer (layer &optional d project-p)
    (dolist (node (layer-nodes layer))
      (compute-1-node node d project-p)))

;input is a list of number for the input layer.
(defun forward-propagation (input net &optional d project-p)
   (incf *fp-count*)
   (mapc #'(lambda (x node)
             (setf (node-value node) x))
        input (layer-nodes (car net)))
   (dolist (layer (cdr net))
     (compute-1-layer layer d project-p))
)

; returns the output
(defun process-input (input net &optional d)
    (forward-propagation input net d)
    (mapcar #'node-value (top-level-nodes net))
)
;;
;; BP functions
;;
;
; Compute the derivative of the activation function.
;
(defun a-prime (node)
   (* (node-value node) (- 1.0 (node-value node))))

(defun delta-sum (node &aux (result 0.0))
   (dolist (link (node-output-links node))
     (incf result
           (* (link-weight link) (get-delta (link-parent link)))))
   (* result (a-prime node)))
```

```
)

(defun clear-d-weights (net)
   (map-links net
              (setf (link-d-weight-1 link) (link-d-weight link))
              (setf (link-d-weight link) 0.0)))

(defun adjust-weights-by-momentum (net &aux momentum)
    (setq momentum
          (if (not (zerop *d-0*))
              (/ *d-1* *d-0*) 1.0))
    (map-links net
        (setf (link-d-weight link)
              (+ (link-d-weight link)
                 (* momentum (link-d-weight-1 link))))))

(setq *momentum* 0.7)

(defun adjust-weights (net &optional d layer)
 (cond (d
        (map-links net
                   (incf (link-weight link)
                         (* d
                            (link-d-weight link))
                   )))
       (layer  ; adjust weights for this layer only
           (map-layer-links (car net)
             (incf (link-weight link)
                   (+ (link-d-weight link)
                      (* *momentum* (link-d-weight-1 link))))))
       (t (map-links net
             (incf (link-weight link)
                   (+ (link-d-weight link)
                      (* *momentum* (link-d-weight-1 link))))))
))

(defun compute-1-error (input expected-output net d project-p &aux (error 0))
   (forward-propagation input net d project-p)
   (set-expected-values expected-output net)
   (unless d (back-propagation net)  )
   (mapcar+ #'(lambda (node)
                 (expt (- (node-value node)
                          (node-expected-value node))
                       2));)
            (top-level-nodes net)))

(defun compute-total-error (training-set net &optional d project-p)
   (mapcar+
       #'(lambda (1-example)
            (compute-1-error (car 1-example) (cadr 1-example) net d project-p))
       training-set)
)

;;
```

```lisp
;; Top-level functions
;;
; Weights are readjusted at the end of the cycle.
(setq error ())
(defun train-1-cycle
          (training-set net &optional (adjust-weight-p T))
    (clear-d-weights net)
    (setq last-error error)
    (setq error (compute-total-error training-set net))
    (if adjust-weight-p (adjust-weights net) )
    error)

(defun train-network
          (cycle training-set net &optional (adjust-weight-p T) &aux error)
   (dotimes (n cycle)
     (case *training*
       (cycle (setq error (train-1-cycle training-set net adjust-weight-P)))
       (case (dolist (x training-set)
               (setq error (train-1-cycle (list x) net adjust-weight-P)))))
       (if (>= *threshold* error) (return error))
))

(defun clear-e-delta-WiXi (net)
    (dolist (node (layer-nodes (cadr net)))
      (setf (node-e-delta-WiXi node) ())))

;==============================
; Following are utility unctions for the linear-probing method
;;
;; A linear-probing method for fast convergence to minima.
;; For use in neural network.
;;
(defstruct data-point
  w f)

(defun slope-to-left-pair (pair)
    (minusp (- (data-point-f (car pair)) (data-point-f (cadr pair)))))

(defun slope-to-right-pair (pair)
 (setq pp pair)
    (plusp (- (data-point-f (car pair)) (data-point-f (cadr pair)))))

(defun slope-to-left (tuple i j)
    (> (- (nth-tuple-value j tuple) (nth-tuple-value i tuple)) 0.0))

(defun slope-to-right (tuple i j)
    (< (- (nth-tuple-value j tuple) (nth-tuple-value i tuple)) 0.0))

(defun nth-tuple-value (i tuple)
   (data-point-f (nth i tuple))
)

;
; Given a tuple of five numbers, returns a list of ranges indicating the
; where the minima might be.
```

```
; Returns a list of potential dips. Note that a DIP may be also a
; DATA-POINT if it has reach a plateau
;
(defun find-convergence-ranges (tuple &optional limit)
  (let ((projections ())  ;pairs
        (dips ())    ; 3-tuples
        (left 0) (right 4))
    (if (slope-to-left tuple left (1+ left))    ; first find left-side slope-off
        (push (list (nth 0 tuple)
                    (do ((j 1 (1+ j)))
                        ((or (slope-to-right tuple j (1+ j))
                             (= j (1- right)))
                         (progn (setq left j)
                                (if (= (1- right) j)
                                    (nth right tuple)
                                    (nth j tuple))))))
              projections))
    (if (slope-to-right tuple (1- right) right)  ; Now find right-side slope-off
        (push (list (do ((j (1- right) (1- j)))
                        ((or (slope-to-left tuple (1- j) j)
                             (= j (1+ left)))
                         (progn (setq right j)
                                (if (= (1+ left) j)
                                    (nth left tuple)
                                    (nth j tuple))))
                        (nth 4 tuple))
              projections))
    (do ((i left (1+ i)))
        ((>= i (1- right)) ())
      (cond ((and (slope-to-right tuple i (1+ i))
                  (slope-to-left tuple (1+ i) (+ 2 i)))
             (push (list (nth i tuple)
                         (nth (+ 1 i) tuple)
                         (nth (+ 2 i) tuple))
                   dips))
            ((= (data-point-f (nth i tuple))
                (data-point-f (nth (+ 1 i) tuple)))
             (push (list (nth (+ 1 i) tuple)
                         (create-middle-point
                          (nth (+ 1 i) tuple) (nth (+ 2 i) tuple))
                         (nth (+ 2 i) tuple))
                   dips)
             )))
    (list projections (reverse dips))
    ))
;
;
; Given a dip, narrow down the range.
;
(defun create-narrowed-dip (dip)
  (find-convergence-ranges
   (list (nth i dip)
         ; interpolated point
         (create-middle-point
          (nth i dip)
```

```
                    (nth (1+ i) dip) )
              (nth (+ 1 i) dip)
              ; interpolated point
              (create-middle-point
                    (nth (1+ i) dip)
                    (nth (+ i 2) dip) )
              (nth (+ 2 i) dip)))
)
(defun v-average (v1 v2)
  (declare (single-float v1 v2))
  (/ (+ v1 v2) 2.0))
(defun create-middle-point (p1 p2 &aux w)
  (make-data-point
     :w (setq w (v-average (data-point-w p1) (data-point-w p2)))
     :f (f w)
))

(defun init-data-point (w)
  (make-data-point :w w :f (f w)))
;
; Given a slope (pair of points), project outward.
; Returns a 3-tuple or the smaller absolute point if it is flat.
;
(defun create-projection (pair &aux new-point result)
     (cond ((slope-to-right-pair pair)
              (setq new-point
                    (init-data-point
                      (+ (data-point-w (cadr pair))
                        (* 2.0 (- (data-point-w (cadr pair))
                                  (data-point-w (car pair)))).)))
              (if (is-a-real-dip
                    (setq result (list (car pair) (cadr pair) new-point)))
                  result
                  (create-projection (cdr result))))
           ((slope-to-left-pair pair)
              (setq new-point
                    (init-data-point
                      (+ (data-point-w (car pair))
                        (* 2.0 (- (data-point-w (car pair))
                                  (data-point-w (cadr pair)))))))
              (if (is-a-real-dip
                    (setq result (cons new-point pair)))
                  result
                  (create-projection (butlast result))))
           (t   ; it is flat
              (cond ((> (abs (data-point-w (car pair)))
                        (abs (data-point-w (cadr pair))))
                     (cadr pair))
                    (t (car pair))))))

(defun is-a-real-dip (3-tuple)
  (and (> (data-point-f (first 3-tuple)) (data-point-f (second 3-tuple)))
       (> (data-point-f (third 3-tuple)) (data-point-f (second 3-tuple)))))

(defun is-flat (dip)
  (or (= (data-point-f (cadr dip)) (data-point-f (car dip)))
      (= (data-point-f (cadr dip)) (data-point-f (caddr dip)))))
```

```
(defun doit2 (dip)
 (setq x dip)
  (when (not (data-point-p dip))
         ; (format t "W: ~A;  F: ~A ...."
         ;       (data-point-w (cadr dip))
         ;       (data-point-f (cadr dip)))
         (format t "  Ws: ~A ~A ~A;  F: ~A ~A ~A...."
           (data-point-w (car dip))
           (data-point-w (cadr dip))(data-point-w (caddr dip))
           (data-point-f (car dip)).(data-point-f (cadr dip))
           (data-point-f (caddr dip)))
         (format t " Gain: ~A~%" (gain dip)))
   (cond ((data-point-p dip)    ; it is flat
          (data-point-w dip))
         ((is-flat dip)
          (data-point-w (cadr dip)))
         ((and (is-a-real-dip dip) (>= *gain-threshold* (gain dip)))
          (data-point-w (cadr dip)))     ; returns solution
         (t
          (let ((result (find-convergence-ranges
                              (list
                                 (car dip)
                                 (create-middle-point (car dip) (cadr dip))
                                 (cadr dip)
                                 (create-middle-point (cadr dip) (caddr dip))
                                 (caddr dip)    ))))
     (setq dd dip)
     (setq rr result)
             (cond ((cadr result)  ;
                    ;(mapcar #'doit2 (cadr result))
                    (doit2 (car (cadr result)))))   ;go after just one for now
                   ((car result)
                         (doit2 (create-projection (caar result)))
                        ; project only one now
                   ))))))

(defun gain (dip)
  (+
    (abs (-  (data-point-f (car dip)) (data-point-f (cadr dip))))
    (abs (-  (data-point-f (caddr dip)) (data-point-f (cadr dip))))))
```

Digital Equipment Corporation

Appendix III Exemplary source code for gradient vector adjustment

```
;;
;; Adjusting direction based on past history
;;

(defun adjust-direction (past-ds current-w last-w)
    (let ((transformed ())
          (ratio ())
          (fmax ())
          (fave ()))
        (transformed (fourier past-ds))
```

```
(setq fmax (apply #'max transformed))
(setq fave (/ (apply #'+ transformed) (length transformed)))
(setq ratio (/ fmax fave))
.(v+ current-w    ; current weight vector
     (v* (abs (- 1 ratio)) last-w))))
```

What is claimed is:

1. A method for adjusting a set of interconnection weight values between processing units in a computer that is configured as an artificial neural network, the artificial neural network comprising a plurality of interconnected processing units arranged in layers including an input layer, a second layer connected to the input layer, and an output layer, each processing unit being arranged to accept a plurality of inputs and provide an output according to a pre-determined activation function, each of the plurality of inputs being weighted according to a pre-determined set of interconnection weight values and each weight value in the set being associated with a connection between the processing units in the artificial neural network, the set of interconnection weight values being stored in a memory coupled to the computer as a set W capable of being represented as a vector W, said artificial neural network being arranged to accept, in the input layer, an input pattern comprising a first data set stored in the memory, process that input pattern in a forward pass of the artificial neural network according to the pre-determined activation functions, set of weight values and corresponding interconnections, and map the input pattern to an actual output pattern comprising a second data set stored in the memory, the artificial neural network also being arranged to accept as input a desired output pattern, comprising a third data set stored in the memory, to be used for comparison against the actual output pattern by computing the sum of the squared differences between the actual and desired output pattern values as an error value E, the interconnection weight values and error value E capable of being mapped to a point WE on a weight space terrain, the weight space terrain comprising a multi-dimensional space determined by a set of all possible interconnection weight values mapped against a set of all possible error values the mapping function calculating an error value E for the set of interconnection weight values W and the input pattern by a forward pass of the neural network and by computing the sum of the squared differences between the actual and desired output pattern values, said weight space terrain having features of local and global minima values and identifiable ravines, said ravines comprising a discernable path to a local or global minimum value from the point WE, with one path to a local or global minimum value capable of being calculated as a gradient through a back propagation technique, the gradient capable of being represented by a set of delta W values, said delta W values comprising a representation of the slope and the direction of the gradient and capable of being represented by a vector delta W, the method for adjusting the set of interconnection weight values in the artificial neural network comprising the steps of:

a. probing for a set of a new error values by:

i. determining a set of probe points along the gradient in the direction of greatest descent, each probe point being represented in terms of a distance d away from the starting point WE, ii. determining a set of new error values corresponding to each probe point, the new error values being determined by calculating the outputs for each processing unit in the artificial neural network, using the predetermined activation function arranged to calculate the output based on the weighted input, the set of interconnection weight values being determined by the distance d each probe is from the point WE along the gradient, and iii. comparing the lowest new error value against a threshold value M, said threshold value M being a preselected value representing a desired minimum error; and b. adjusting the interconnection weight values for the artificial neural network by updating the set of interconnection weight values stored in the memory to the set of weight values corresponding to the lowest new error value that is below the threshodl M.

2. The method of claim 1 wherein the new error value at each probe point is determined by the following additional steps:

i. providing a logistic activation function wherein the output of the units of the artificial neural network is expressed as a function of the natural number e to the power of the weighted input to the unit, said weighted input to the unit being expressed as a function of the input to each unit of the artificial neural network during a forward pass of the input pattern, the weight set vector W, the gradient vector, delta W and the probe point value d, said expression of the natural number e being arranged in a plurality of e components, each component comprising a function e to the power of divisible part of the weighted input function;

a. pre-computing each of the plurality of e components;

b. storing the pre-computer values in a memory; and c. determining the new error values for each of the probe points, using the pre-computed values stored in the memory to compute the output for each unit.

3. The method of claim 2 wherein the activation function is the logistic activation function:

$$\frac{1}{1 + e^{-dot(\Delta w, o)} (e^{-dot(w,o)})^d e^{-\theta}}$$

4. The method of claim 2 wherein the e components are:

$A = e^{-dot(\Delta w, o)}$;

$B = e^{-dot(\Delta, o)}$; and $C = e^{-\theta}$.

5. The method of claim 4 wherein the stored component values are computed as:

$$\frac{1}{1 + A(B^d)C}.$$

6. The method of claim 2 comprising the following additional steps:
   a. identifying a second layer of units within the artificial neural network, said second layer comprising units that are connected to and receive weighted input from a plurality of units of the input layer; and
   b. calculating new E values for the probe points using the precomputation steps of claim 2 for only the second layer units.

7. The method of claim 1 wherein the method of selecting and processing the set of probe points comprises the following additional steps:
   a. selecting high (H) and low (L) probe point values along the gradient in the direction of steepest descent wherein those high (H) and low (L) points are expressed as a distance d away from point WE along the gradient;
   b. selecting between said high (H) and low (L) probe points, a plurality of middle probe point values along the gradient wherein those middle probe point values are expressed as distances d away from point WE along the gradient;
   c. determining a new error value at each probe point, said error value being determined by calculating the outputs for each unit in the network, using the activation function arranged to accept inputs weighted according to the corresponding set of new weight values represented in terms of being a distance d away from the starting point WE along the gradient; and
   d. recursively performing steps a and b in claim 1 and steps a–c in this claim above, setting a new low value to be equal to the high (H) value and a new high value to be equal to a point beyond the previous high value (H), if the new E value associated with the high probe point is less than the new E value of the middle probe point that is associated with the middle probe point that is adjacent to the high probe point.

8. The method of claim 7 comprising the following additional step of recursively performing steps a and b in claim 1 and steps a–c in claim 7 above by first setting a new high value to be equal to the low (L) value and a new low value to be equal to a point beyond the previous low value (L), if the new E value associated with the low probe point is less than the new E value associated with the middle probe point that is adjacent to the low probe point.

9. The method of claims 1 and 7 comprising the following additional steps:
   a. determining whether a lower minimum E value is obtainable between probe points be:
   i. selecting a test case probe point having a d value that is smaller than one probe point and larger than another; and
   ii. comparing the new error value associated with a test case one of the middle probe points against the new E values associated with the probe points immediately adjacent to it, a dip being identified when the new error value associated with the test case one of the middle probe points is less than either of the new error values associated with the probe points immediately adjacent to it; and
   b. recursively perform the steps a and b in claim 1 and steps a–c in claim 7 above, if a dip has been identified, by first setting a new high value and a new low value to be equal to the probe point values immediately adjacent to the test case one of the middle probe points, if there is new error value that is less than the threshold value and if the new error value associated with the test case one of the middle probe points that is less than the error values that are associated with the probe points that are immediately adjacent to the test case middle probe point.

10. The method of claim 1 comprising the further steps of:
    a. providing a location in the computer memory to store historical data concerning interconnection weight value adjustments executed in claim 1 by:
    i. creating a delta W vector storage table to contain the delta W vectors, representative of gradients, each corresponding to one of a plurality of input patterns, and
    ii. creating a learning step storage table to contain a set of d values for each interconnection weight value adjustment made the d values representing the distance from WE for a given input pattern to the probe point corresponding to the lowest new error value, used to adjust the set of interconnection weight values in the artificial neural network;
    b. storing the delta W vector in the delta W storage table; and
    c. storing the d value representing the distance from WE to the probe point for the probe point corresponding to the lowest new error value, used to adjust the set of interconnection weight values in the artificial neural network in the learning step table.

11. The method of claim 10 comprising the further step of repeating the steps of claim 1 and steps b and c of claim 10 for a plurality of different input sets, each input set mapping to an actual output set and having a corresponding desired output set for comparison.

12. The method of claim 11 further comprising a method to adjust the path of linear probing to more closely follow the convergence path of a ravine in a weight space terrain, the method comprising the steps of:
    a. determining the periodicity of the historical data stored in the learning step table, to determine patterns of a long learning step comprising a large d value as compared to a small learning step comprising a small d value in the learning step table;
    b. determining a numerical weighting factor to apply to the linear probe path of the gradient, the numerical weighting factor determined by a function incorporating the periodicity of the long step followed by the short step, the value difference between the long and short steps, and the magnitude of the long and short steps; and
    c. adjusting the direction of the linear probe path of the gradient vector by weighting the delta W vector at point WE according to the numerical weighting factor.

13. The method of claim 12 wherein the step of determining the periodicity of the historical data stored in the learning step table comprises the step of performing a discrete Fourier transform on the d values in the learning step table and returning a set of values F each one of the F values corresponding to a d value in the learning step table.

14. The method of claim 13 wherein the step of adjusting the linear probe direction of the gradient comprises the following steps:
   a. identifying the largest F value;
   b. determining the average F value;
   c. determining an intermediate value LA where LA equals the largest F value minus the average F value and that difference is divided by the average F value; and
   d. adjusting the new linear probing direction to be equal to $$\blacktriangle W_n = (LA * d_{-1} * \blacktriangle W_{-1} + d_o * \blacktriangle W_o) + W$$

15. A method for correcting pattern recognition error in a computer that is configured as an artificial neural network, said artificial neural network comprising a plurality of interconnected processing units arranged in layers including an input layer, a second layer connected to the input layer, and an output layer, each processing unit being arranged to accept a plurality of inputs and provide an output according to a pre-determined activation function, each of the plurality of inputs being weighted according to a predetermined set of interconnection weight values and each weight value in the set being associated with a connection between the processing units in the artificial neural network, the set of interconnection weight values being stored in a memory coupled to the computer as a set W capable of being represented as a vector W, the artificial neural network being arranged to accept, in the input layer, an input pattern comprising a first data set stored in the memory, process that input pattern in a forward pass of the artificial neural network according to the pre-determined activation functions, set of weight values and corresponding interconnections, and map the input pattern to an actual output pattern comprising a second data set stored in the memory, the artificial neural network also being arranged to accept as input a desired output pattern comprising a third data set stored in the memory to be used to determine the pattern recognition error for the input pattern by computing the sum of the squared differences between the actual and desired output patterns and storing the result as an error value E, the interconnection weight values and error value E capable of being mapped to a point WE on a weight space terrain, the weight space terrain comprising a space determined by a set of all possible interconnection weight values mapped against a set of all possible error values by mapping those weight values for a given input pattern through the set of interconnected processing units of the artificial neural network using the pre-determined activation functions and taking that output pattern and computing the sum of the squared differences between the actual and desired output patterns, said weight space terrain having features of local and global minima values and identifiable ravines, the ravines comprising a discernable path to a local or global minimum value, with a path from the point WE to a local or global minimum value capable of being calculated as a gradient through a backpropagation technique, the gradient capable of being represented by a set of delta W values, the delta W values comprising a representation of the slope and the direction of the gradient and capable of being represented by a vector delta W, the gradient being used as a probe line for determining different points in the weight space and comparing them for a reduced error value E, the method for correcting pattern recognition error in the artificial neural network comprising the steps of:
   a. selecting a set of probe points along the probe line;
   b. providing a logistic activation function wherein the output of the units of the artificial neural network is expressed as a function of the natural number e to the power of the weighted input to the unit, said weighted input to the unit being expressed as a function of the input to each unit of the artificial neural network during a forward pass of the input pattern, preselected components of the weight set vector W, preselected components of gradient vector delta W and the step value d, the expression of the natural number e to the power of the weighted input, within the logistic function, being arranged in a plurality of divisible parts to express the exponential e function;
   c. pre-computing the divisible parts of the expression of the natural number e to the power of the weighted input of the value e;
   d. storing the pre-computed values in the memory coupled to the computer;
   e. determining the E values for each of the probe points, using the pre-computed values stored in the memory in evaluating the activation function for each unit; and
   f. correcting the pattern recognition error by adjusting the set of interconnection weight values stored in the memory to the set of interconnecting weight values corresponding to the lowest of the E values that are below the threshold M.

16. The method of claim 15 wherein the activation function is the logistic activation function:

$$\frac{1}{1 + e^{-dot(\blacktriangle w, o)} (e^{-dot(w, o)})^d e^{-\theta}}$$

17. The method of claim 15 wherein the component values stored are the following values:
$A = e^{-dot(\blacktriangle w, o)}$;
$B = e^{-dot(w, o)}$; and
$C = e^{-\theta}$.

18. The method of claim 17 wherein the stored component values are computed as:

$$\frac{1}{1 + A(B^d)C}.$$

19. The method of claim 16 comprising the following additional steps:
   a. identifying a second layer of units within the artificial neural network, said second layer comprising units that are connected to an receive weighted input from a plurality of units of the input layer; and
   b. calculating new E values for the probe points using the precalculation steps of claim 15 for only the second layer units.

20. A method for correcting pattern recognition error in a computer that is configured as an artificial neural network, said artificial neural network comprising a plurality of interconnected processing units arranged in layers including an input layer, a second layer connected to the input layer, and an output layer, each processing unit being arranged to accept a plurality of inputs and provide an output according to a pre-determined activation function, each of the plurality of inputs being weighted according to a predetermined set of interconnection weight values and each weight value in the set being associated with a connection between processing units in the artificial neural network, the set of interconnection weight values being stored in a memory coupled to the computer as a set W capable of being represented as a vector W, said artificial neural network being arranged to accept, in the input layer, an input pattern comprising a first data set stored in the memory, process that input pattern in a forward pass of the artificial neural network according to the pre-determined activation functions, set of weight values and corresponding interconnections, and map the input pattern to an actual output pattern comprising a second data set stored in the memory, said artificial neural network also being arranged to accept as input a desired output pattern comprising a third data set stored in the memory to be used to determine the pattern recognition error for the input pattern by calculating and storing in the memory the sum of the squared differences between the actual and desired output patterns as an error value E, said interconnection weight values and error value E capable of being mapped to a point WE on a weight space terrain, said weight space terrain comprising a space determined by a set of all possible interconnection weight values mapped against a set of all possible error values by mapping those weight values for a given input pattern through the plurality of interconnected processing units of the artificial neural network using the pre-determined activation functions and taking that output pattern and computing the sum of the squared differences between the actual and desired output patterns, said weight space terrain having features of local and global minima values and identifiable ravines, said ravines comprising a discernable path to a local or global minimum value, with a path from the point We to a local or global minimum value capable of being calculated as a gradient through a backpropagation technique, the gradient capable of being represented by a set of delta W values, said delta W values comprising a representation of the slope and the direction of the gradient and capable of being represented by a vector delta W, the gradient being used as a probe line for determining different points in the weight space and comparing them for a reduced error value E, each probe point represented by a different distance value d away from the point WE, the correction method being a technique to adjust the set of interconnection weight values stored in the memory for the artificial neural network to be the weight values in the weight space terrain corresponding to the probe point with the lowest error value E, the d value of that probe point being considered a learning step taken in adjusting the interconnection weight values of the artificial neural network, the method for correcting pattern recognition error in the artificial neural network comprising the steps of:

a. providing a location in the computer memory to store historical data concerning weight value corrections executed by the comparison technique by:
 i. creating a delta W vector storage table in the memory to contain the delta W vectors, representative of gradients each corresponding to one of a plurality of input patterns, and
 ii. creating a learning step storage table in the memory to contain a set of d values for each weight value adjustment made, the d value representing the distance from WE for a given input pattern to the probe point corresponding to the lowest new E value, used to adjust the set of interconnection weight values stored in the memory for the artificial neural network, the set of d values in the learning step storage table capable of being represented as a vector d;

b. determining weight adjustments for the interconnection weight values of the artificial neural network for a plurality of input patterns according to the weight value adjustments technique, each weight value adjustment performed having a corresponding delta W and learning step value associated with the adjustment for a particular input pattern;

c. storing the delta W vector corresponding to each weight value adjustment performed in the delta W storage table in the memory;

d. storing each d value, representing the distance from WE to the probe point for the probe point corresponding to the lowest new E value, used to adjust the set of interconnection weight values in the artificial neural network for each input pattern in the learning step table;

e. determining the periodicity of the historical data stored in the learning step table, to determine the occurrences of a pattern of a long learning step followed by a short learning step, the long learning step comprising a large d value as compared to a small learning step comprising a small d value, in the learning step table;

f. determining a numerical weighting factor to apply to the linear probe path of the probe line, the numerical weighting factor determined by a function incorporating the periodicity of the long step followed by the short step, the value difference between the long and short steps, and the magnitude of the long and short steps;

g. adjusting the direction of the linear probe path by weighting the delta W vector at point WE according to the numerical weighting factor;

h. recursively performing steps b through g until the new E value is below a threshold value M; and i. correcting the pattern recognition error by adjusting the set of interconnection weight values stored in the memory to the set of interconnection weight values corresponding to the lowest of the E values that are below the threshold M.

21. The method of claim 20 wherein the step of determining the periodicity of the historical data stored in the learning step table comprises the step of performing a discrete Fourier transform on the d values in the learning step table and returning a set of F values each one of the F values corresponding to a d value in the learning step table.

22. The method of claim 20 wherein the step of adjusting the linear probe direction of the gradient comprises the following steps:
 a. identifying the largest F value;
 b. determining the average F value;
 c. determining an intermediate value LA where LA equals the largest F value minus the average F value and that difference is divided by the average F value; and
 d. adjusting the new linear probing direction to be equal to (LA*dot(d, delta W))+W.

23. A method for adjusting a set of interconnection weight values between processing units in a computer that is configured as an artificial neural network, said artificial neural network comprising a plurality of interconnected processing units arranged in layers including an input layer, output layer and middle layer, each unit being arranged to accept a plurality of inputs and provide an output according to a pre-determined activation function, each of the plurality of inputs being weighted according to a predetermined set of interconnection weight values and each weight value in the set being associated with an interconnection in the artificial neural network, the set of interconnection weight values of the artificial neural network being stored in a memory coupled to the computer as a data set W, said artificial neural network being arranged to accept, in the input layer, an input pattern comprising a first data set stored in the memory, process that input pattern according to the predetermined activation functions, weight values and interconnections, and map the input pattern to an actual output pattern comprising a second data set stored in the memory, said artificial neural network also being arranged to accept as input a desired output pattern comprising a third data set stored in the memory, to be used for comparison against the actual output pattern with an error value E for the artificial neural network comprising the sum of the squared differences between the actual and desired output patterns, the method to adjust the set of interconnection weight values for the artificial neural network comprising the steps of:

a. treating the set of interconnection weight values W and the error value E as a single point WE in a weight space terrain, said weight space terrain comprising a space determined by a set of all possible interconnection weight values mapped against a set of all possible error values, said weight space terrain having features of local and global minima and identifiable ravines, comprising a discernable path to a local or global minimum;

b. accepting as input an error threshold value M;

c. determining a gradient showing the direction of steepest descent on the weight space terrain at the point WE, the determination of the gradient performed by generating a set of delta weight values for the set W of interconnection weight values in the artificial neural network according to a backpropagation method, the backpropagation method calculating a value for each interconnection weight value in the set W in response to apportioning the difference between the actual output pattern and the desired output pattern on each interconnection weight value, said set of delta weight values being the gradient;

d. selecting a set of probe points along the gradient;

e. determining the distance d of each probe point away from the point WE;

f. determining a new set of W values on the weight space terrain corresponding to each probe point value using the point WE and d to compute new points along the gradient and corresponding points on the weight space terrain;

g. determining for each set of new W values a new error value E, said new error values determined by computing a new output pattern, using the new W values and the activation function of the artificial neural network, and comparing said new output pattern against the desired output pattern;

h. determining the lowest new error value E;

i. comparing the lowest new error value E against the threshold value M; and j. adjusting the set of interconnection weight values stored in the memory for the artificial neural network to be equivalent to the new set W which corresponds to the lowest new E value, if the lowest new E value is less than the threshold M.

24. The method of claim 23 wherein the method of determining the new error values E for each set of new W values, using the activation function of the artificial neural network, comprises the further steps:

a. identifying a second layer within the layer of units in the artificial neural network said second layer of units comprising units that are connected to and receive inputs from input layer units;

b. providing a logistic activation function where the output of a unit of the neural network is determined by an exponential function of e, wherein the exponent is arranged with components including a first component comprising an expression of e to the power of a function of the set of interconnection weight values W represented as a vector, and a second component comprising an expression of e to the power of a function of the delta w values represented as a vector;

c. computing each first and second component of the logistic activation function;

d. storing the computed first and second components of the logistic function; and e. computing the new error values E for each probe point, using the stored computed sub-parts of the logistic function, wherein the said first stored component is exponentiated by the learning step value d.

25. The method of claim 1 wherein the method of selecting and processing the set of probe points comprises the following additional steps:

a. selecting high and low probe point values along the gradient;

b. determining the distances away from the point WE for each high and low probe point;

c. selecting between said high and low probe points, a set of middle probe point values along the gradient;

d. determining for each middle probe point value its distance away from the point WE;

e. determining a new set of W values on the weight space terrain corresponding to each high, low and middle probe point value;

f. determining for each set of new W values a new error value E, using the activation function of the artificial neural network;

g. recursively performing steps (a)–(f) above, where the new error value E corresponding to the high probe point is less than the new error value E of the middle probe point that is adjacent to the high probe point, wherein a new low value is set to the high value and a new high value point is selected along the gradient beyond the previous high value;

h. recursively performing steps (a)–(f) above, where the new error value E corresponding to the low probe point is less than the new error value E of the middle probe point that is adjacent to the low probe point, wherein a new high value is set to the low value and a new low value point is elected along the gradient beyond the previous low value point;

i. identify any possible dips in the weight space terrain by determining whether the new error value E, corresponding to a middle probe point is less than the error values corresponding to the probe points immediately adjacent to it;

j. accept as input a threshold value T; and k. if there is no new error value E that is less than the threshold value T, and a dip and been identified, recursively perform steps (a)–(i) above, where the high and low probe values are set to be the probe points adjacent to the probe point that has been identified as the dip.

26. The method of claim 23 comprising the further steps of:

a. storing the set of delta weight values in a memory; and b. storing the value representing the distance from WE to the probe point for the probe point corresponding to the lowest new E value and used to adjust the set of weights in the artificial neural network.

27. The method of claim 26 comprising the further step of repeating the steps of claim 23 for a plurality of different input sets, each input set mapping to an actual output set and having a corresponding desired output set for comparison.

28. The method of claim 27 further comprising adjusting the set of interconnection weight values in the artificial neural network by adjusting the direction gradient for probing according to the likelihood of finding a ravine in the weight space terrain, the method comprising the steps of:

a. determining the periodicity of the set of stored d values, said d values corresponding to the learning steps taken for each different input set, said determination yielding a set of F values;

b. identifying the largest F value as $F_{max}$;

c. averaging the other F values as $F_{ave}$;

d. determining LA, wherein LA equals the value of $F_{max}$ minus $F_{ave}$ divided by $F_{ave}$;

e. determining a direction vector to replace the gradient by multiplying LA times the present distance and delta weight values plus the immediately previous distance and delta weight values; and f. performing the steps of claim 26 using the direction vector.

29. The method of claim 28 wherein the method for determining the periodicity of the set of stored d values comprises a discrete Fourier transform.

30. A device for adjusting a set of interconnection weight values between processing units in a computer that is configured as an artificial neural network, the device adapted to be coupled to the artificial neural network, the artificial neural network comprising a plurality of interconnected processing units arranged in layers including an input layer, a second layer connected to the input layer, and an output layer, each unit being arranged to accept a plurality of inputs and provide an output according to a pre-determined activation function, each of the plurality of inputs being weighted according to a pre-determined set of interconnection weight values and each weight value in the set being associated with a connection in the artificial neural network, the set of interconnection weight values being stored in a memory coupled to the computer as a set W capable of being represented as a vector W, said artificial neural network being arranged to accept, in the input layer, an input pattern comprising a first data set stored in the memory, process that input pattern in a forward pass of the network according to the unit activation functions, set of weight values and corresponding interconnections, and map the input pattern to an actual output pattern, comprising a second data set stored in the memory, the artificial neural network also being arranged to accept as input a desired output pattern, comprising a third data set stored in the memory, to be used for comparison against the actual output pattern by computing the sum of the difference between the actual and desired output pattern values and storing the calculation as an error value E, the interconnection weight values and error value E capable of being mapped to a point WE on a weight space terrain, the weight space terrain comprising a multi-dimensional space determined by a set of all possible interconnection weight values mapped against a set of all possible error values by a forward pass of the neural network for the input pattern and computing the sum of the squared differences between the actual and desired output pattern values, said weight space terrain having features of local and global minima values and identifiable ravines, said ravines comprising a discernable path to a local or global minimum value from the point WE, with one path to a local or global minimum value capable of being calculated as a gradient through a backpropagation technique, the gradient capable of being represented by a set of delta W values, said delta W values comprising a representation of the slope and the direction of the gradient and capable of being represented by a vector delta W, the device comprising:

a. means for probing for a set of new error values including:

i. means for determining a set of probe points along the gradient in the direction of greatest descent, each probe point being represented in terms of a distance d away from the starting point WE, and ii. means for determining a set of new error values corresponding to each probe point, the new error values being determined by calculating the outputs for each unit in the network, using the activation function arranged to calculate the output based on the weighted input, the set of interconnection weight values being determined by the distance d each probe is from the point WE along the gradient;

b. means for comparing the lowest new error value against a threshold value M, said threshold value M being a preselected value representing a desired minimum error; and c. means for adjusting the current set of interconnection weight values stored in the memory for the artificial neural network to the set of interconnection weight values corresponding to the lowest of the new error values that are below the threshold M.

31. The device of claim 30 wherein the means by determining the new error value at each probe point further comprises:

a. means for providing a logistic activation function wherein the output of the units of the artificial neural network is expressed as a function of the natural number e to the power of the weighted input to the unit, said weighted input to the unit being expressed as a function of the input to each unit of the artificial neural network during a forward pass of the input set, the weight set vector W, the gradient vector, delta W and the probe point value d, said expression of the natural number e being arranged in a plurality of e components, each component comprises a function e to the power of divisible part of the weighted input function;

b. means for pre-computing each of the plurality of e components;

c. means for storing the pre-computed values in a memory; and d. means for determining the new error values for each of the probe points, using the pre-computed values stored in the memory to compute the output for each unit.

32. The device of claim 31 wherein the activation function comprises the logistic activation function:

$$\frac{1}{1 + e^{-dot(\Delta w,o)} (e^{-dot(w,o)})^d e^{-\theta}}$$

33. The device of claim 31 wherein the e components are:
$A = e^{-dot\Delta W,O)}$;
$B = e^{-dot(w,o)}$; and
$C = e^{-\theta}$.

34. The device of claim 33 wherein the stored component values are computed as:

$$\frac{1}{1 + A(B^d)C}$$

35. The device of claim 31 further comprising:.
a. means for identifying a second layer of units within the artificial neural network, said second layer comprising units that are connected to and receive weighted input from a plurality of units of the input layer; and
b. means for calculating new E values for the probe points using the pre-computation of the logistic function components of claim 31 only for the second layer units.

36. The device of claim 30 further comprising:
a. means for providing a location in the computer memory to store historical data concerning weight adjustments including:
   i. means for creating a delta W vector storage table to contain the delta W vectors, representative of gradients each corresponding to one of a plurality of input sets, and
   ii. means for creating a learning step storage table to contain a set of d values for each weight adjustment made, the d values representing the distance from WE for a given input set to the probe point corresponding to the lowest new error value, used to adjust the set of interconnection weight values in the artificial neural network;
b. means for storing the delta W vector in the delta W storage table; and
c. means for storing the d value in the learning step storage table, said d value representing the distance from WE to the probe point for the probe point corresponding to the lowest new error value used to adjust the set of interconnection weight values in the artificial neural network.

37. The device of claim 36 further comprising a means to adjust the path of linear probing to more closely follow the convergence path of a ravine in a weight space terrain, the means comprising:
a. means for determining the periodicity of the historical data stored in the learning step table, to determine patterns of a long learning step comprising a large d value as compared to a small learning step comprising a small d value in the learning step table;
b. means for determining a numerical weighting factor to apply to the linear probe path of the gradient, the numerical weighting factor determined by a function incorporating the periodicity of the long step followed by the short step, the value difference between the long and short steps, and the magnitude of the long and short steps; and
c. means for adjusting the direction of the linear probe path of the gradient vector by weighting the delta W vector at point WE according to the numerical weighting factor.

38. The device of claim 37 wherein the means for determining the periodicity of the historical data stored in the learning step table comprises means for performing a discrete Fourier transform on the d values in the learning step table and returning a set of values F each one of the F values corresponding to a d value in the learning step table.

39. The device of claim 38 wherein the means for adjusting the linear probe direction of the gradient comprises:
a. means for identifying the largest F value;
b. means for determining the average F value;
c. means for determining an intermediate value LA where LA equals the largest F value minus the average F value and that difference is divided by the average F value; and
d. means for adjusting the new linear probing direction to be equal to (LA*dot(d, delta W))+W.

40. The device of claim 30 further comprising:
a. means for receiving external input and converting said external input to an input pattern comprising electronic signals to be processed by the artificial neural network, said external input comprising textual material printed on paper.

* * * * *